US009682721B2

(12) United States Patent
Murakami et al.

(10) Patent No.: US 9,682,721 B2
(45) Date of Patent: Jun. 20, 2017

(54) ARM STOPPER MECHANISM, AND ELECTRIC POWER-STEERING DEVICE USING ARM STOPPER MECHANISM

(71) Applicant: SHOWA CORPORATION, Gyoda-shi (JP)

(72) Inventors: Takuya Murakami, Haga-gun (JP); Shinji Kuno, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 221 days.

(21) Appl. No.: 14/065,576

(22) Filed: Oct. 29, 2013

(65) Prior Publication Data

US 2014/0290432 A1 Oct. 2, 2014

(30) Foreign Application Priority Data

Mar. 28, 2013 (JP) ................................ 2013-070676

(51) Int. Cl.
*B62D 3/02* (2006.01)
*B62D 5/04* (2006.01)
*B62K 5/08* (2006.01)

(52) U.S. Cl.
CPC ............. *B62D 3/02* (2013.01); *B62D 5/0421* (2013.01); *B62K 5/08* (2013.01); *Y10T 74/18888* (2015.01)

(58) Field of Classification Search
CPC ........................................................ B62D 3/00
USPC ....................................................... 74/388 PS
See application file for complete search history.

(56) References Cited

U.S. PATENT DOCUMENTS

| | | | | |
|---|---|---|---|---|
| 2,198,780 A * | 4/1940 | Macpherson | B62D 7/16 | 403/227 |
| 7,775,318 B2 | 8/2010 | Okada et al. | | |
| 7,930,950 B2 * | 4/2011 | Saito | B62D 1/16 | 74/388 PS |
| 7,992,671 B2 * | 8/2011 | Okada | B60R 16/04 | 180/444 |
| 8,122,993 B2 * | 2/2012 | Ripley | B62D 5/04 | 180/233 |
| 8,517,142 B1 | 8/2013 | Farrar et al. | | |

(Continued)

FOREIGN PATENT DOCUMENTS

| | | |
|---|---|---|
| JP | 59-067166 A | 4/1984 |
| JP | 59-089270 A | 5/1984 |

(Continued)

OTHER PUBLICATIONS

Bedane, Tesfaye Lema; "Basic Mathematics for Grade 9 Algebra and Geometry: Graphs of Basic Power and Rational Functions"; 2012; Trafford Publishing; pp. 337.*

(Continued)

*Primary Examiner* — William Kelleher
*Assistant Examiner* — Gregory Prather
(74) *Attorney, Agent, or Firm* — Leason Ellis LLP

(57) ABSTRACT

An arm stopper mechanism, includes a pitman arm which includes an output shaft hole into which an output shaft is fitted, two tie rod holes onto which tie rods are respectively mounted, and two abutting faces to which a stopper is abutted; and the stopper which includes two contact faces, in which an angle formed by the two contact faces of the stopper is greater than an angle formed by the two abutting faces of the pitman arm and is 90° or more.

12 Claims, 16 Drawing Sheets

(56) References Cited

U.S. PATENT DOCUMENTS

| | | | | |
|---|---|---|---|---|
| 2007/0175696 | A1* | 8/2007 | Saito | B62D 1/16 180/444 |
| 2008/0024080 | A1* | 1/2008 | Ogawa | B62D 5/04 318/432 |
| 2008/0199253 | A1* | 8/2008 | Okada | B62D 1/10 403/359.1 |
| 2008/0238149 | A1* | 10/2008 | Yamashita | B62K 5/01 296/203.01 |
| 2011/0101904 | A1* | 5/2011 | Sakamoto | B62D 5/0481 318/473 |
| 2012/0160593 | A1* | 6/2012 | Nozaki | B62K 5/08 180/400 |
| 2013/0048410 | A1* | 2/2013 | Ishikawa | B62D 5/061 180/441 |
| 2015/0274205 | A1 | 10/2015 | Murakami et al. | |

FOREIGN PATENT DOCUMENTS

| | | | |
|---|---|---|---|
| JP | 10-210815 | A | 8/1998 |
| JP | 2007-098984 | A | 4/2007 |
| JP | 2007-196927 | A | 8/2007 |

OTHER PUBLICATIONS

Office Action mailed Nov. 12, 2015 for the related U.S. Appl. No. 14/582,658.

Office Action mailed Sep. 6, 2016 for the corresponding Japanese Patent Application No. 2013-070676.

* cited by examiner

ARM STOPPER MECHANISM, AND ELECTRIC POWER-STEERING DEVICE USING ARM STOPPER MECHANISM

CROSS-REFERENCE TO RELATED APPLICATIONS

This application is based on and claims priority under 35 U.S.C. 119 from Japanese Patent Application No. 2013-070676 filed on Mar. 28, 2013, the entire content of which is incorporated herein by reference.

BACKGROUND

1. Technical Field

The present invention relates to an arm stopper mechanism for inhibiting a turning angle of a pitman arm mounted with a tie rod, and an electric power-steering device using such an arm stopper mechanism.

2. Related Art

For example, with a saddle-ride type vehicle such as an all terrain vehicle (ATV), the electric power-steering device is interposed between a steering shaft on the side of the steering wheel and a steering member on the side of the wheels (front wheels). The electric power-steering device is a device which assists, by using the torque generated by an electric motor, the steering force applied by the driver to the steering wheel.

The electric power-steering device incorporates members such as an input shaft, a torsion bar, and an output shaft. The input shaft is coupled to the steering shaft on the steering wheel side. The torsion bar is coupled to the input shaft and the output shaft. A pitman arm is mounted on the output shaft (for instance, refer to JP-A-2007-196927 (FIG. 2)).

A pitman arm is a steering member on the side of the wheels (front wheels). The pitman arm is provided with tie rod holes to which tie rods are mounted. The wheels are coupled to the tie rods. The pitman arm is configured to turn about the output shaft.

When the driver attempts to turn the steering wheel beyond the maximum steering angle in the clockwise direction or the counterclockwise direction, the electric power-steering device needs to restrict the turning of the steering wheel so that the vehicle will not fall over. As a mechanism for preventing the foregoing fall-over, the electric power-steering device is provided with an arm stopper mechanism which restricts the turning angle of the pitman arm with a stopper.

The stopper is provided in a manner of protruding in a downward direction from the lower face side of the housing of the electric power-steering device. When the driver attempts to turn the steering wheel beyond the maximum steering angle in the clockwise direction or the counter-clockwise direction, the arm stopper mechanism is configured such that the abutting faces provided to the pitman arm are abutted to the contact faces of the stopper. Thus, the arm stopper mechanism restricts the turning angle of the pitman arm using the stopper and consequently restricts the turning of the steering wheel.

With this kind of electric power-steering device, when the bending load that is applied to the output shaft increases, since the output shaft is coupled to the steering wheel via the input shaft, the torsion bar and the steering shaft, the steering wheel will vibrate and cause the steering to become difficult.

Accordingly, with an electric power-steering device, it is desirable to inhibit the bending load that is applied to the output shaft.

SUMMARY OF INVENTION

Nevertheless, with a related-art electric power-steering device, since a related-art arm stopper mechanism is not of a configuration which gives consideration to inhibiting the bending load that is applied to the output shaft as explained below, there is a problem in that the steering would sometimes become difficult.

For example, when the abutting face on one side of the pitman arm and the contact face on one side of the stopper are abutting, the bending load vector applied to the output shaft will be the value of the synthetic vector of the input load vector that is input from the wheels via the tie rods and the abutting load vector that is applied to the abutting face of the pitman arm from the stopper.

Thus, the value of the bending load vector tends to increase as the angle formed by the direction of the input load vector and the direction of the abutting load vector decreases, and contrarily tends to decrease as the angle formed by the direction of the input load vector and the direction of the abutting load vector increases.

Accordingly, for instance, when the angle formed by the direction of the input load vector and the direction of the abutting load vector is an acute angle (0 to less than 90°), the bending load vector will become a value that is greater than the value of the synthetic vector when the input load vector and the abutting load vector are caused to be orthogonal. Meanwhile, when the angle formed by the direction of the input load vector and the direction of the abutting load vector is an obtuse angle (90 to 180°), the bending load vector will become a value that is not greater than the value of the synthetic vector when the input load vector and the abutting load vector are caused to be orthogonal.

Note that the direction of the input load vector is determined based on the mounting direction of the tie rods mounted on the tie rod holes. Moreover, the direction of the abutting load vector will be a direction that is perpendicular to the abutting face of the pitman arm (or the contact face of the stopper). In addition, the position to which the abutting load vector is applied will be the center position of the part where the abutting face of the pitman arm and the contact face of the stopper come into contact (hereinafter referred to as the "abutting center position").

Here, a virtual straight line which passes a center point in a width direction of a vehicle and extends in a front-back direction of the vehicle is referred to as the "center line of the overall vehicle", and a point on the center line of the overall vehicle where the straight lines that were virtually disposed along the two contact faces intersect is explained as the "starting point of the contact face".

By way of reference, with a related-art arm stopper mechanism, the angle formed by the two contact faces of the stopper was set to be smaller than the angle formed by the two abutting faces of the pitman arm; for instance, the angle formed by the two abutting faces of the pitman arm was set to 180°, and the angle formed by the two contact faces of the stopper was set to 90°.

With a related-art arm stopper mechanism, since the angle formed by the two contact faces of the stopper is set to 90°, the two abutting center positions are provided at positions which are 45° leftward and rightward from the "center line of the overall vehicle" with the "starting point of the contact face" as the center.

With this kind of related-art arm stopper mechanism, when the abutting face on one side of the pitman arm and the contact face on one side of the stopper are abutting, the abutting load vector is applied to the abutting center position in a direction that is 45° from the "center line of the overall vehicle". Moreover, with a related-art arm stopper mechanism, due to the relation of the mounting direction of the tie rods, the input load vector is applied around the tie rod holes in a direction where the angle formed with the input load vector becomes an acute angle (0 to less than 90°).

This kind of related-art arm stopper mechanism does not give consideration to the angle formed by the direction of the input load vector and the direction of the abutting load vector as described above. Thus, with a related-art electric power-steering device which uses a related-art arm stopper mechanism, there were cases where the bending load applied to the output shaft would relatively increase and cause the steering wheel to vibrate, and thereby cause the steering to be difficult.

With respect to this point the inventors of the present invention considered that, since the bending load vector is a synthetic vector of the input load vector and the abutting load vector, the bending load could be inhibited by adopting a configuration where the input load vector and the abutting load vector work to cancel each other.

Subsequently, the inventors of the present invention considered that the bending load can be inhibited by configuring the arm stopper mechanism such that the relation of the angle formed by the two contact faces of the stopper and the angle formed by the two abutting faces of the pitman arm becomes an opposite relation to a related-art arm stopper mechanism (that is, so that the angle formed by the two contact faces of the stopper becomes greater than the angle formed by the two abutting faces of the pitman arm), and additionally configuring the arm stopper mechanism such that the angle formed by the two contact faces of the stopper is set to be not less than the angle (90°) of a related-art arm stopper mechanism.

The present invention was devised in order to resolve the foregoing problems, and the main object of this invention is to provide an arm stopper mechanism for inhibiting the bending load that is applied to the output shaft, and an electric power-steering device which uses such an arm stopper mechanism.

In order to achieve the foregoing object, a first invention is an arm stopper mechanism, including a pitman arm which turns around an output shaft on a lower face side of a housing of an electric power-steering device and to which two tie rods connected to wheels are mounted, and a stopper which is provided around the output shaft on the lower face side of the housing of the electric power-steering device and which restricts a turning angle of the pitman arm, wherein the pitman arm includes an output shaft hole having a virtual straight line which passes a center point in a width direction of a vehicle and extends in a front-back direction of the vehicle as a center line, and into which the output shaft is fitted, two tie rod holes provided at positions forward of the output shaft hole on left and right of the center line and onto which the tie rods are respectively mounted, and two abutting faces provided at positions forward of the output shaft hole and rearward of the tie rod holes on left and right of the center line and to which the stopper is abutted, wherein the stopper includes two contact faces provided at positions in a turning direction of the abutting faces of the pitman arm on left and right of the center line and which come into contact with the respective abutting faces of the pitman arm, and wherein an angle formed by the two contact faces of the stopper is greater than an angle formed by the two abutting faces of the pitman arm and is 90° or more.

The bending load vector is the synthetic vector of the input load vector and the butting load vector. Thus, the bending load can be inhibited if the input load vector and the abutting load vector work to cancel each other. The configuration in which the input load vector and the abutting load vector cancel each other is realized by increasing the angle formed by the direction of the input load vector and the direction of the abutting load vector. The configuration of increasing the angle formed by the direction of the input load vector and the direction of the abutting load vector can be realized by decreasing the angle formed by the center line of the pitman arm and the abutting face, and, relative thereto, increasing the angle formed by the center line of the stopper and the contact face.

With the arm stopper mechanism according to the first invention, the angle formed by the two contact faces of the stopper is greater than the angle formed by the two abutting faces of the pitman arm and is 90° or more. Based on the foregoing configuration, the arm stopper mechanism can cause the input load vector and the abutting load vector to cancel each other. Consequently, the arm stopper mechanism can inhibit the value of the bending load vector that is applied to the output shaft. Thus, the arm stopper mechanism can inhibit the bending load that is applied to the output shaft.

The arm stopper mechanism according to the first invention may have a configuration in which the angle formed by the two contact faces of the stopper is 180° or more.

The arm stopper mechanism configured as described above can cause the part (that is, the center position of the part which comes into contact with the abutting face of the pitman arm and the contact face of the stopper), to which the abutting load vector is applied, to approach the periphery of the tie rod role to which the input load vector is applied. Thus, the arm stopper mechanism configured as described above can efficiently inhibit vibrations.

The arm stopper mechanism according to the first invention may have a configuration in which a total value of the angle formed by the two contact faces of the stopper and the angle formed by the two abutting faces of the pitman arm is 270° or less.

The arm stopper mechanism configured as described above, by satisfying the foregoing condition, can ensure an angle of 90° or more as the total maximum steering angel in the clockwise direction and the counterclockwise direction.

The arm stopper mechanism according to the first invention may have a configuration in which the pitman arm is formed in a plate shape as a whole, a shape thereof viewed from a lower side is a shape of a fan which spreads at an acute angle, both wings of the fan being bent outward at a halfway portion, the output shaft hole is disposed at a position of a pivot of the fan, the two tie rod holes are disposed at arbitrary positions near a free end of the fan, and the two abutting faces of the pitman arm are respectively provided to side face portions of a body of the pitman arm.

With the arm stopper mechanism configured as described above, the abutting faces are respectively provided to side face portions of the pitman arm body. In addition, with the arm stopper mechanism configured as described above, the input load vector and the abutting load vector cancel each other. Thus, the arm stopper mechanism can inhibit the bending load that is applied to the output shaft.

The arm stopper mechanism according to the first invention may have a configuration in which the stopper is provided in a manner of protruding in a downward direction from the lower face side of the housing of the electric power-steering device, and a shape thereof viewed from a lower side is a shape which connects a trapezoidal part of a substantially trapezoidal shape and a rectangular part of a substantially rectangular shape with each other, the trapezoidal part and the rectangular part are disposed such that a central point on a lower side of the trapezoidal part and a central point on a long side of the rectangular part coincide with a central point of the output shaft, and the rectangular part is configured such that a short side is a width of a value which is the same as a clearance between a parallel plane, which passes a center point of the output shaft hole of the pitman arm and is parallel to the abutting face, and the abutting face, and a long side on a side that is not connected with the trapezoidal part functions as the contact face.

With the arm stopper mechanism configured as described above, since the stopper is of a configuration that is suitable for the pitman arm, it is possible to inhibit the bending load.

The arm stopper mechanism according to the first invention may have a configuration in which the pitman arm is formed in a plate shape as a whole and a shape thereof viewed from a lower side is a shape of a fan which spreads at an acute angle, the output shaft hole is disposed at a position of a pivot of the fan, and the two tie rod holes are disposed near both wings near a free end of the fan, and the two abutting faces of the pitman arm are respectively provided to side face portions of a protruding part which protrudes upward near a center of a top face of a body of the pitman arm.

With the arm stopper mechanism configured as described above, the abutting faces of the pitman arm are respectively provided to side face portions of a protruding part which protrudes upward near the center of a top face of the pitman arm body. In addition, with the arm stopper mechanism configured as described above, the input load vector and the abutting load vector cancel each other. Thus, the arm stopper mechanism configured as described above can inhibit the bending load that is applied to the output shaft. In addition, with the arm stopper mechanism configured as described above, since the pitman arm is configured such that the abutting face does not protrude in the turning direction, the pitman arm can be configured in a compact manner.

The arm stopper mechanism according to the first invention may have a configuration in which the stopper is provided in a manner of protruding in a downward direction from the lower face side of the housing of the electric power-steering device, and a shape thereof viewed from a lower side is formed in a substantially circular shape centering around a center point of the output shaft and notched in an arc shape, and notched end faces function as the contact faces.

With the arm stopper mechanism configured as described above, since the stopper is of a configuration that is suitable for the pitman arm, it is possible to inhibit the bending load.

Moreover, a second invention is an electric power-steering device, wherein the arm stopper mechanism according to the first invention is provided to the lower face side of the housing.

Since the electric power-steering device according to the second invention is provided with the arm stopper mechanism according to the first invention, it can inhibit the bending load that is applied to the output shaft.

According to the present invention, it is possible to inhibit the bending load that is applied to the output shaft.

DESCRIPTION OF EMBODIMENTS

Figure 1A:
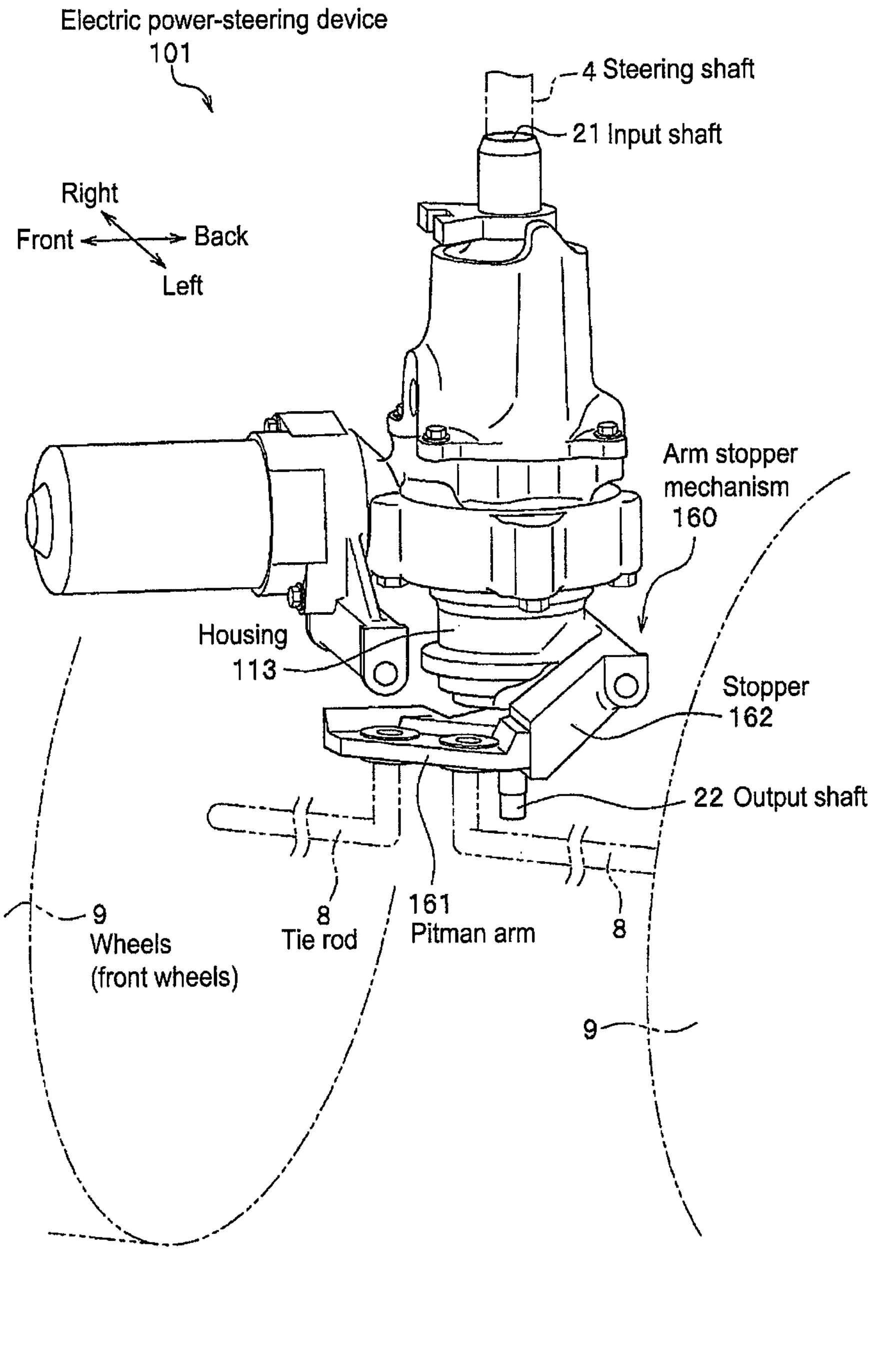
FIG. 1A is a schematic configuration diagram of the arm stopper mechanism according to the first embodiment provided to an electric power-steering device viewed from a side face direction.

An embodiment of the present invention (hereinafter referred to as "this embodiment") is now explained with reference to the drawings. Note that the respective drawings are schematically shown so far as the sufficient understanding of the present invention is enabled. Thus, the present invention is not limited to the illustrated examples. Moreover, the common constituent elements in the respective drawings and similar constituent elements are given the same reference numeral and any redundant explanation thereof is omitted.

Here, let it be assumed that the directions of "up", "down", "front", "back", "left" and "right" are based on the direction of the vehicle. Note that, among the drawings, there are those which view the configuration from the lower side direction of the vehicle. In these diagrams, it will appear that the directions of "left" and "right" are reversed. Nevertheless, the directions of "left" and "right" shall be as indicated in the drawings since they are directions of viewing the configuration from the lower side direction of the vehicle.

First Embodiment

The configuration of the arm stopper mechanism 160 according to the first embodiment is now explained.

Here, in order to facilitate the understanding of the explanation of the features of the arm stopper mechanism 160 according to the first embodiment, the configuration of the arm stopper mechanism 60 according to the comparative example is foremost explained with reference to FIGS. 10A and 10B, and FIGS. 11A and 11B to FIGS. 12A and 12B, and the load vectors applied to the principal parts of the arm stopper mechanism 60 according to the comparative example are subsequently explained with reference to FIG. 13.

Thereafter, the relation of the input load vector and the abutting load vector, and the bending load vector is explained with reference to FIG. 13 and FIGS. 14A to 14C.

Furthermore thereafter, the configuration of the arm stopper mechanism 160 according to the first embodiment is explained with reference to FIGS. 1A and 1B, and FIGS. 2A and 2B to FIGS. 4A and 4B, and the load vectors applied to the principal parts of the arm stopper mechanism 160 according to the first embodiment are subsequent explained with reference to FIG. 5.

<Configuration of Arm Stopper Mechanism According to Comparative Example>

Figure 10A:
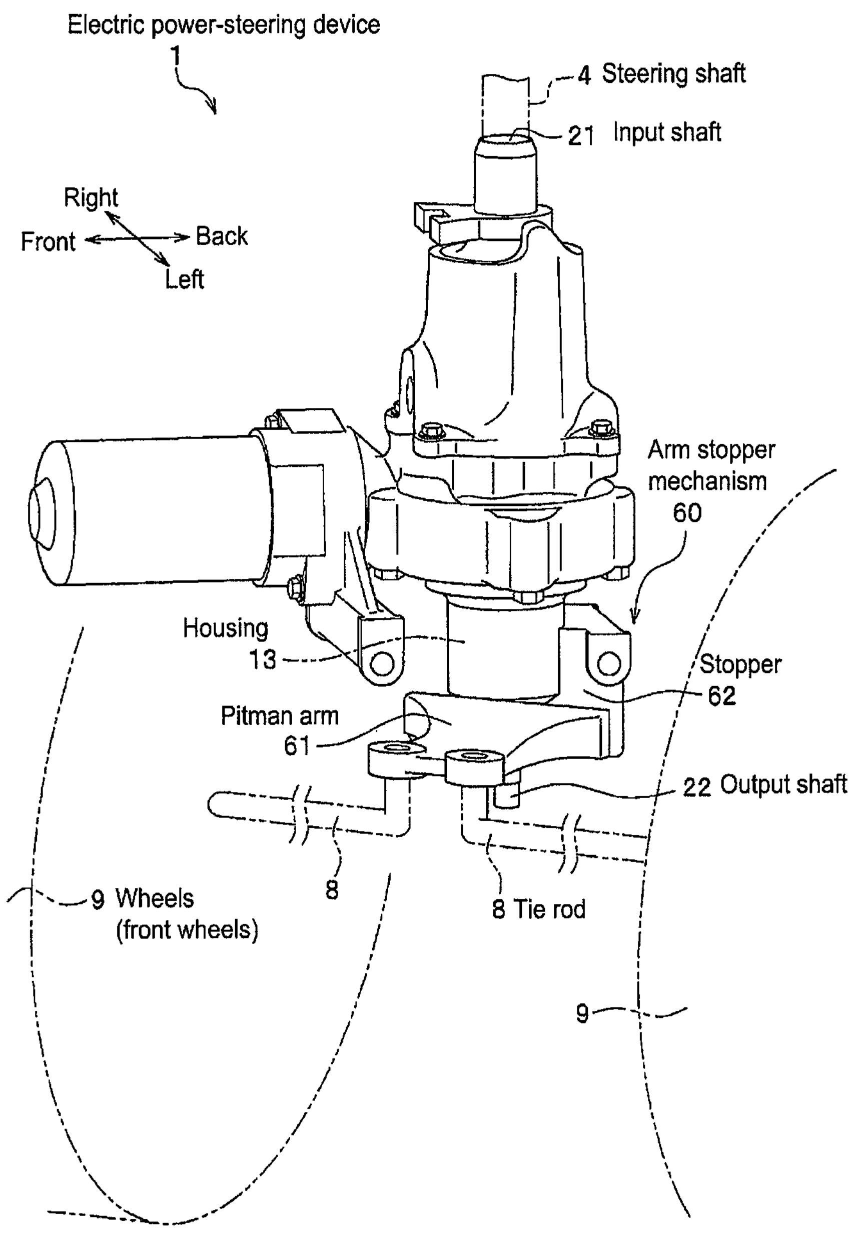
FIG. 10A is a schematic configuration diagram of the arm stopper mechanism according to the comparative example provided to an electric power-steering device viewed from a side face direction.
Figure 10B:
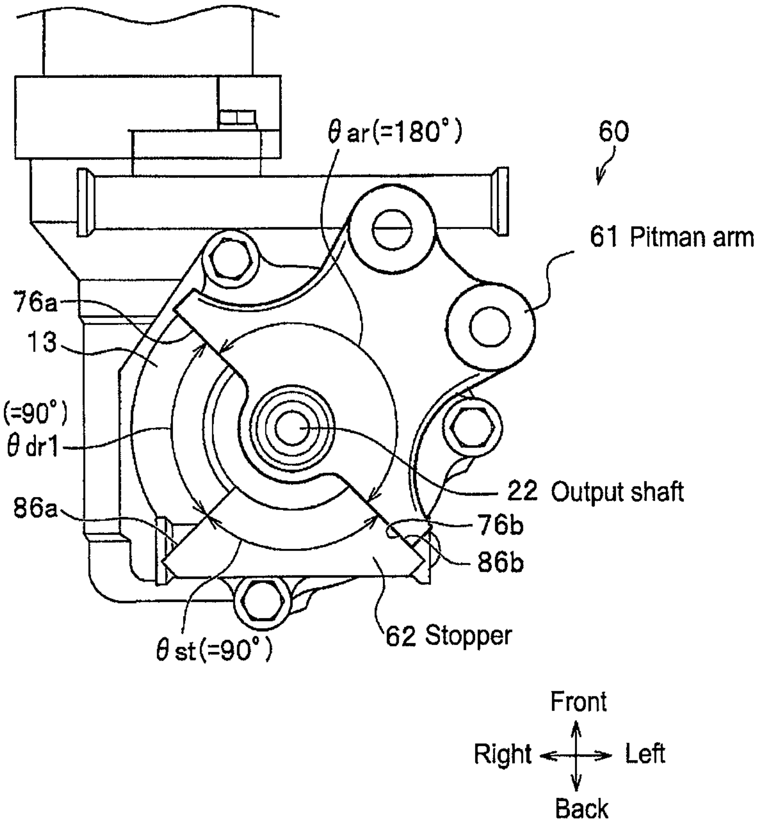
FIG. 10B is a schematic configuration diagram of the arm stopper mechanism according to the comparative example viewed from a lower face direction.
Figure 11B:
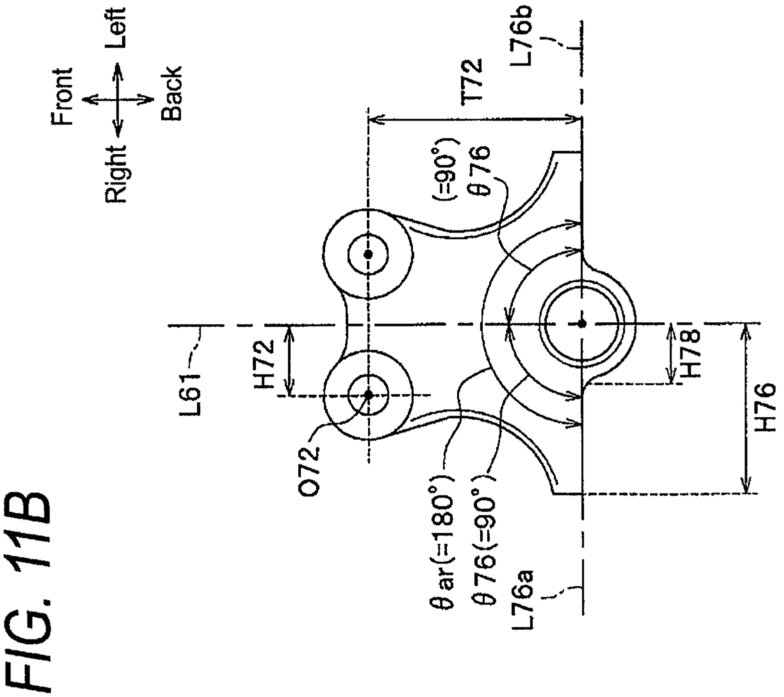
FIGS. 11A and 11B are schematic configuration diagrams of the pitman arm of the arm stopper mechanism according to the comparative example viewed from a lower face direction.
Figure 11A:
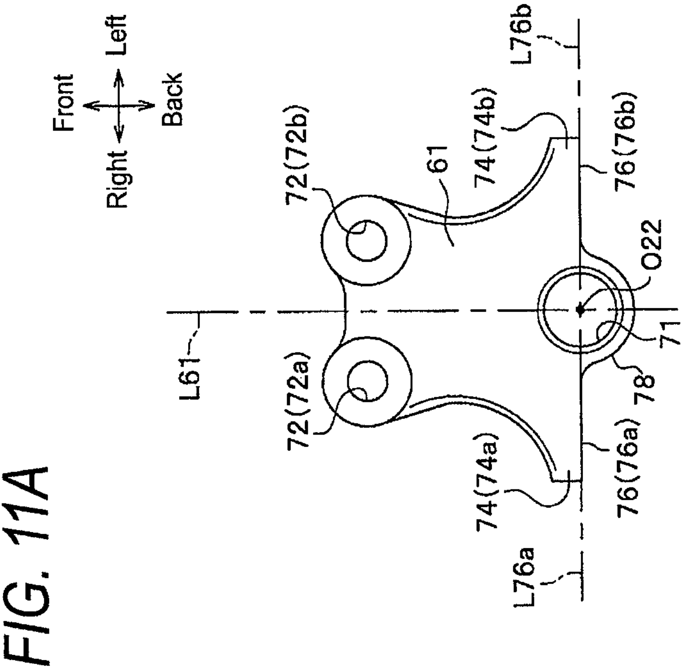
Figure 12B:
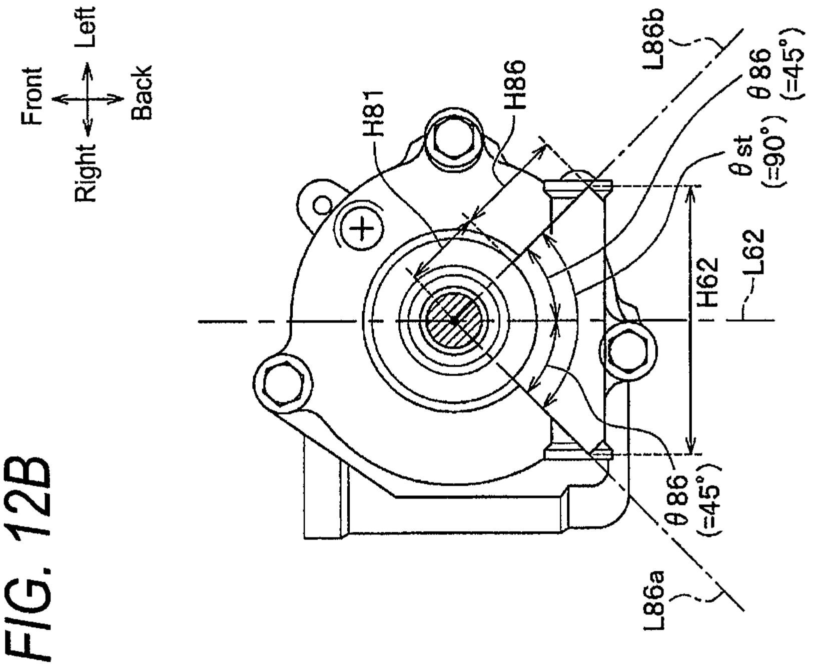
FIGS. 12A and 12B are schematic configuration diagrams of the stopper of the arm stopper mechanism according to the comparative example viewed from a lower face direction.
Figure 12A:
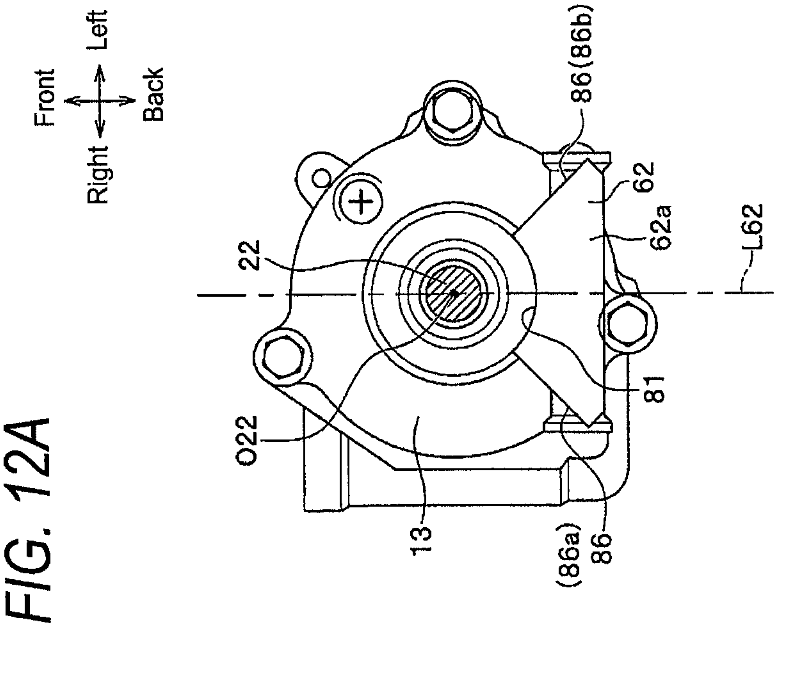

The configuration of the arm stopper mechanism 60 according to the comparative example is now explained with reference to FIGS. 10A and 10B, and FIGS. 11A and 11B to FIGS. 12A and 12B. FIG. 10A is a schematic configuration diagram of the arm stopper mechanism 60 according to the comparative example provided to an electric power-steering device 1 viewed from a side face direction. FIG. 10B is a schematic configuration diagram of the arm stopper mechanism 60 according to the comparative example viewed from a lower face direction. FIGS. 11A and 11B are schematic configuration diagrams of the pitman arm 61 of the arm stopper mechanism 60 according to the comparative example viewed from a lower face direction. FIGS. 12A and 12B are schematic configuration diagrams of the stopper 62 of the arm stopper mechanism 60 according to the comparative example viewed from a lower face direction.

As shown in FIG. 10A, with a saddle-ride type vehicle such as an all terrain vehicle (ATV), the electric power-steering device 1 is interposed between a steering shaft 4 on the side of the steering wheel and a pitman arm 61 which is a steering member on the side of the wheels (front wheels) 9.

The electric power-steering device 1 internally comprises members such as an input shaft 21, a torsion bar (not shown), and an output shaft 22. The input shaft 21 is coupled to the steering shaft 4 on the steering wheel side. The torsion bar (not shown) is coupled to the input shaft 21 and the output shaft 22. The pitman arm 61 is mounted on the output shaft 22.

The pitman arm 61 is a steering member on the side of the wheels (front wheels) 9. Tie rods 8 coupled to the wheels 9 are mounted on the pitman arm 61. The tie rods 8 are disposed in a manner of extending in the width direction of the vehicle, and one end thereof is coupled to the pitman arm 61 near the center in the width direction of the vehicle, and the other end is coupled to the wheels (front wheels) 9. The pitman arm 61 is spline-fitted to the output shaft 22, and configured to turn about the output shaft 22.

When the driver attempts to turn the steering wheel beyond the maximum steering angle in the clockwise direction or the counterclockwise direction, the electric power-steering device 1 needs to restrict the turning of the steering wheel so that the vehicle will not fall over. As a mechanism for preventing the foregoing fall-over, the electric power-steering device 1 is provided with the arm stopper mechanism 60 which restricts the turning angle of the pitman arm 61 with the stopper 62.

The stopper 62 is provided in a manner of protruding in a downward direction from the lower face side of the housing 13 of the electric power-steering device 1. When the driver attempts to turn the steering wheel beyond the maximum steering angle in the clockwise direction or the counterclockwise direction, the arm stopper mechanism 60 is configured such that the abutting faces 76*a*, 76*b* (refer to FIGS. 11A and 11B) provided to the pitman arm 61 is abutted to the stopper 62. Thus, the arm stopper mechanism 60 restricts the turning angle of the pitman arm 61 using the stopper 62 and consequently restricts the turning of the steering wheel.

FIG. 10B shows the configuration of the arm stopper mechanism 60 viewed from a lower face direction. As shown in FIG. 10B, the arm stopper mechanism 60 comprises a pitman arm 61 which turns about the output shaft 22.

In the example shown in FIG. 10B, with the arm stopper mechanism 60, the angle θar formed by the abutting faces 76*a*, 76*b* (refer to FIGS. 11A and 11B) provided to the pitman arm 61 is set to 180°. Moreover, the angle θst formed by the contact faces 86*a*, 86*b* (refer to FIGS. 12A and 12B) provided to the stopper 62 is set to 90°. Moreover, the maximum steering angle θdr of turning the pitman arm 61 is set to 90° (that is, the maximum steering angle in the clockwise direction is 45°, and the maximum steering angle in the counterclockwise direction is 45°).

FIGS. 11A and 11B show a specific configuration of the pitman arm 61. FIG. 11A shows a configuration of the respective parts of the pitman arm 61, and FIG. 11B shows the arrangement of the respective parts of the pitman arm 61.

As shown in FIG. 10A, the pitman arm 61 is formed in a plate shape as a whole.

In addition, as shown in FIGS. 11A and 11B, one output shaft hole 71 and two tie rod holes 72*a*, 72*b* are provided to the pitman arm 61. The output shaft hole 71 is a circular hole to which the output shaft 22 is fitted. The tie rod holes 72*a*, 72*b* are circular holes to which the tie rods 8 are mounted. In the ensuing explanation, the tie rod holes 72*a*, 72*b* are referred to as the "tie rod hole 72" when reference is made collectively.

As a result of the output shaft 22 being fitted inside the output shaft hole 71, the center point thereof will coincide with the center point O22 of the output shaft 22. In the ensuing explanation, the center point of the output shaft hole 71 is sometimes referred to as the "center point O22".

The tie rod holes 72*a*, 72*b* are disposed at equal positions on the left and right of the center line L61 of the pitman arm 61. In the example shown in FIGS. 11A and 11B, the tie rod holes 72*a*, 72*b* are disposed such that the respective center points O72 are disposed at positions that are a distance T72 forward from the center point O22 of the output shaft hole 71, and positions that are a distance H72 leftward and rightward from the center line L61 of the pitman arm 61.

Note that, here, the "center line L61 of the pitman arm 61" is explained as the virtual straight line which passes the center point O22 of the output shaft hole 71 and extends in the front-back direction. The "center line L61 of the pitman arm 61" will coincide with the "center line L62 of the stopper 62 (refer to FIGS. 12A and 12B)" explained later when the steering angle of the steering wheel is 0°. The "center line L62 of the stopper 62" is also the virtual straight line which passes the center point in the width direction of the vehicle and extends in the front-back direction of the vehicle (hereinafter referred to as the "center line of the overall vehicle").

The pitman arm 61 comprises parts (hereinafter referred to as the "abutting parts") 74*a*, 74*b* to which the stopper 62 is abutted. The abutting parts 74*a*, 74*b* are provided near either side of the output shaft hole 71 of the body of the pitman arm 61 formed in a plate shape. The end faces of the abutting parts 74*a*, 74*b* are formed as flat faces (hereinafter referred to as the "abutting faces") 76*a*, 76*b* to which the stopper 62 is abutted. In the ensuing explanation, the abutting parts 74*a*, 74*b* are referred to as the "abutting part 74" when reference is made collectively. Moreover, the abutting faces 76*a*, 76*b* are referred to as the "abutting face 76" when reference is made collectively.

The placement angle θ76 of the respective abutting faces 76*a*, 76*b* is set to 90° relative to the center line L61 of the pitman arm 61. Accordingly, the angle θar formed by the abutting faces 76*a* and the abutting faces 76*b* is set to 180°. Here, "placement angle of the abutting faces" refers to the angle formed by the center line and the abutting faces.

Note that, in FIGS. 11A and 11B, line L76*a* shows the straight line that is virtually disposed along the abutting face 76*a*. Moreover, line L76*b* shows the straight line that is virtually disposed along the abutting face 76*b*. The line L76*a* and the line L76*b* intersect at the center point O22 of the output shaft hole 71. Moreover, length H76 shows the distance from the center point O22 of the output shaft hole 71 of the pitman arm 61 to the ends of the abutting faces 76.

The pitman arm 61 comprises a circular part 78 which surrounds the output shaft hole 71 in an arc shape. The circular part 78 is formed to be successive to the abutting parts 74*a*, 74*b*. Note that, in FIGS. 11A and 11B, length H78 shows the distance from the center point O22 of the output shaft hole 71 of the pitman arm 61 to the end of the circular part 78.

FIGS. 12A and 12B show specific configurations of the stopper 62. FIG. 12A shows the configuration of the respective parts of the stopper 62, and FIG. 12B shows the arrangement of the respective parts of the stopper 62.

As shown in FIG. 10A, the stopper 62 is provided in a manner of protruding in a downward direction from the lower face side of the housing 13 of the electric power-steering device 1. As shown in FIGS. 12A and 12B, the stopper 62 is configured such that the shape viewed from the lower side is a shape of an isosceles triangle with the center point O22 of the output shaft 22 as the apex, the width of the base as H62, and the width of the oblique side as (H81+H86), the fan-shaped notch part 81 (refer to FIG. 12A) of the radius H81 is formed at the apex portion of such isosceles triangle so as to be equal at the left and right of the center line L62 of the stopper 62.

Note that, here, the "center line L62 of the stopper 62" is explained as the virtual straight line which passes over the center point O22 of the output shaft 22 and extends in the front-back direction. The "center line L62 of the stopper 62" is also the center line of the overall vehicle.

The stopper 62 comprises two flat faces 86*a*, 86*b* positioned at the oblique side portion of the isosceles triangle, and the flat faces 86*a*, 86*b* function as the contact faces to come into contact with the abutting faces 76*a*, 76*b* of the pitman arm 61. In the ensuing explanation, the flat face 86*a* is referred to as the "contact face 86*a*" and the flat face 86*b* is referred to as the "contact face 86*b*". Moreover, the contact faces 86*a*, 86*b* are referred to as the "contact face 86" when reference is made collectively.

The placement angle θ86 of the respective contact faces 86*a*, 86*b* is set to 45° relative to the center line L62 of the stopper 62. Accordingly, the angle θst formed by the contact faces 86*a* and the contact faces 86*b* is set to 90°. Here, the "placement angle of the contact faces" refers to the angle formed by the center line and the contact faces.

Note that, in FIGS. 12A and 12B, line L86*a* shows the straight line that is virtually disposed along the contact faces 86*a*, and line L86*b* shows the straight line that is virtually disposed along the contact faces 86*b*. The line L86*a* and the line L86*b* intersect at the center point O22 of the output shaft 22.

<Load Vectors Applied to Principal Parts of Arm Stopper Mechanism According to Comparative Example>

The load vectors that are applied to the principal parts of the arm stopper mechanism 60 are now explained with reference to FIG. 13. FIG. 13 is an explanatory diagram of the load vectors applied to the principal parts of the arm stopper mechanism 60.

Here, the explanation is provided with the load vector from the side of the wheels 9 (refer to FIG. 10A) which is input to the pitman arm 61 from the tie rod holes 72 as the "input load vector Wh", the load vector applied to the abutting face 76 of the pitman arm 61 from the contact face 86 of the stopper 62 as the "abutting load vector Wb", and the load vector applied to the output shaft 22 fitted into the output shaft hole 71 (refer to FIG. 11A) as the "bending load vector Wt".

Moreover, here, the center position of the part where the abutting face 76 of the pitman arm 61 and the contact face 86 of the stopper 62 come into contact is referred to as the "abutting center position O76", and the explanation is provided on the assumption that the abutting load vector Wb is applied to the abutting center position O76. Note that, in the example shown in FIG. 13, the abutting center position O76 is set at a position that is a distance R from the center point O22 of the output shaft 22.

Figure 13:
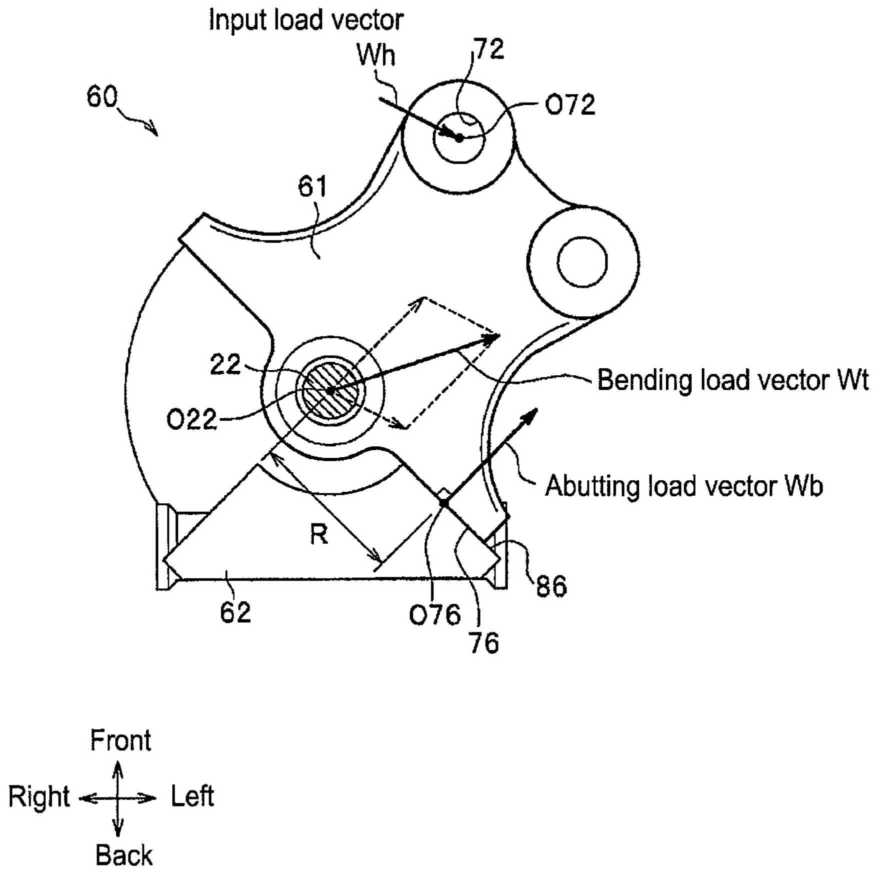
FIG. 13 is an explanatory diagram of the load vectors applied to the principal parts of the arm stopper mechanism according to the comparative example.

Moreover, here, as shown in FIG. 13, the explanation is provided on the assumption that the left-side abutting face 76 of the pitman arm 61 is abutted to the left-side contact face 86 of the stopper 62. In the foregoing case, as shown in FIG. 13, with the arm stopper mechanism 60, the input load vector Wh is applied around the tie rod holes 72, the abutting load vector Wb is applied to the abutting center position O76, and the bending load vector Wt is applied to the output shaft 22.

The value of the bending load vector Wt becomes the value of the synthetic vector obtained by synthesizing the input load vector Wh and the abutting load vector Wb. Note that the direction of the input load vector Wh is determined by the mounting direction of the tie rods 8 (refer to FIG. 10A) mounted on the tie rod holes 72. Moreover, the direction of the abutting load vector Wb is a direction that is perpendicular to the abutting face 76 of the pitman arm 61.

<Relation of Input Load Vector and Abutting Load Vector, and Bending Load Vector>

Figure 14C:
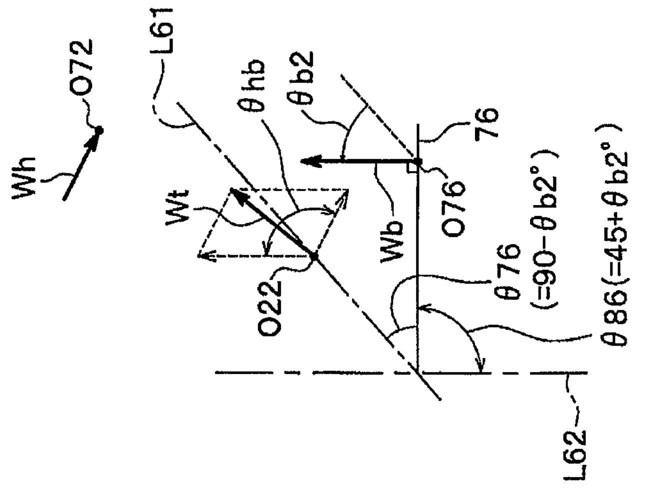
FIGS. 14A to 14C are schematic diagrams showing the relation of the input load vector and the abutting load vector, and the bending load vector.
Figure 14B:
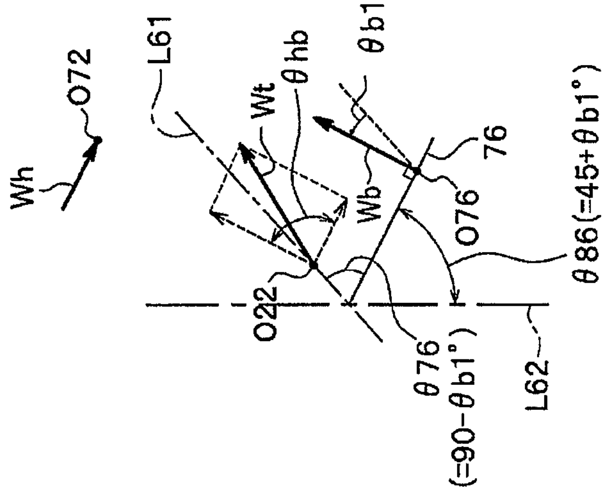
Figure 14A:
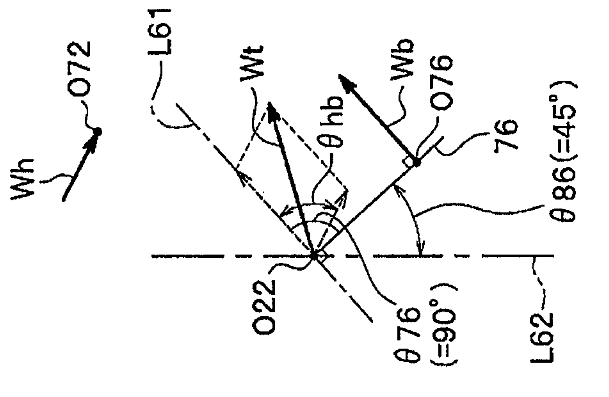

The relation of the input load vector Wh and the abutting load vector Wb, and the bending load vector Wt is now explained with reference to FIG. 13 and FIGS. 14A to 14C. FIGS. 14A to 14C are schematic diagrams showing the relation of the input load vector Wh and the abutting load vector Wb, and the bending load vector Wt. Here, as shown in FIG. 13, the explanation is provided on the assumption that the left-side abutting face 76 of the pitman arm 61 is abutted to the left-side contact face 86 of the stopper 62.

FIGS. 14A to 14C show how the value of the value of the bending load vector Wt will change in cases where the left-side abutting face 76 of the pitman arm 61 is abutted to the left-side contact face 86 of the stopper 62 as shown in FIG. 13 and the orientation of the abutting face 76 of the pitman arm 61 and the contact face 86 of the stopper 62 is changed. Note that, in FIGS. 14A to 14C, the center point O72 of tie rod holes 72, the abutting center position O76, and the center point O22 of the output shaft 22 are respectively of the positional relation shown in FIG. 13.

FIG. 14A shows a state where the orientation of the abutting face 76 of the pitman arm 61 and the contact face 86 of the stopper 62 is not changed. In other words, FIG. 14A shows an example of a case where the angle θ76 formed by the center line L61 of the pitman arm 61 and the abutting face 76 of the pitman arm 61 is set to 90°. To put it differently, FIG. 14A shows an example of a case where the angle θ86 formed by the center line L62 of the stopper 62 and the contact face 86 of the stopper 62 is set to 45°.

Moreover, FIG. 14B shows a state where the orientation of the abutting face 76 of the pitman arm 61 is tilted to the side of the center line L61 by an angle θb1 from the state shown in FIG. 14A so that the direction of the input load vector Wh and the direction of the abutting load vector Wb will be orthogonal. In other words, FIG. 14B shows an example of a case where the angle θ76 formed by the center line L61 of the pitman arm 61 and the abutting face 76 of the pitman arm 61 is set to (90−θb1)°, which is smaller than 90°. To put it differently, FIG. 14B shows an example of a case where the angle θ86 formed by the center line L62 of the stopper 62 and the contact face 86 of the stopper 62 is set to (45+θb1)°, which is greater than 45°.

Moreover, FIG. 14C shows a state where the orientation of the abutting face 76 of the pitman arm 61 is tilted to the side of the center line L61 by an angle θb2 (provided that angle θb2>angle θb1) from the state shown in FIG. 14A. In other words, FIG. 14C shows an example of a case where the angle θ76 formed by the center line L61 of the pitman arm 61 and the abutting face 76 of the pitman arm 61 is set to (90−θb2)°, which is even smaller than the angle (90−θb1)° of the state shown in FIG. 14B. To put it differently, FIG. 14C shows an example of a case where the angle θ86 formed by the center line L62 of the stopper 62 and the contact face 86 of the stopper 62 is set to (45+θb2)°, which is even greater than (45+θb1)°.

As described above, the value of the bending load vector Wt is a value of the synthetic vector that is obtained by synthesizing the input load vector Wh and the abutting load vector Wb. Thus, the value of the bending load vector Wt tends to increase as the angle θhb formed by the direction of the input load vector Wh and the direction of the abutting load vector Wb decreases, and contrarily tends to decrease as the angle θhb formed by the direction of the input load vector Wh and the direction of the abutting load vector Wb increases.

In the example shown in FIG. 14A, the angle θhb formed by the direction of the input load vector Wh and the direction of the abutting load vector Wb is an acute angle (0 to less than 90°). In the example shown in FIG. 14B, the angle θhb formed by the direction of the input load vector Wh and the direction of the abutting load vector Wb is a right angle (90°). In the example shown in FIG. 14C, the angle θhb formed by the direction of the input load vector Wh and the direction of the abutting load vector Wb is an obtuse angle (90 to 180°).

Thus, in the example shown in FIG. 14A, the bending load vector Wt is of a value that is greater than the synthetic vector when the input load vector Wh and the abutting load vector Wb are caused to be orthogonal (value of the bending load vector Wt in the state shown in FIG. 14B). Meanwhile, in the example shown in FIG. 14C, the bending load vector Wt is of a value that is smaller than the synthetic vector when the input load vector Wh and the abutting load vector Wb are caused to be orthogonal (value of the bending load vector Wt in the state shown in FIG. 14B).

Accordingly, as shown in FIG. 14C, the arm stopper mechanism 60 can inhibit the value of the bending load vector Wt that is applied to the output shaft 22 by increasing the angle θhb formed by the direction of the input load vector Wh and the direction of the abutting load vector Wb and causing the input load vector Wh and the abutting load vector Wb to cancel each other.

Here, as described above, FIG. 14A shows an example of a case where the angle θ76 formed by the center line L61 of the pitman arm 61 and the abutting face 76 of the pitman arm 61 is set to 90°; that is, an example of a case where the angle θ86 formed by the center line L62 of the stopper 62 and the contact face 86 of the stopper 62 is set to 45°.

Moreover, FIG. 14B shows an example of a case where the angle θ76 formed by the center line L61 of the pitman arm 61 and the abutting face 76 of the pitman arm 61 is set to (90−θb1)°, which is smaller than 90°; that is, an example of a case where the angle θ86 formed by the center line L62 of the stopper 62 and the contact face 86 of the stopper 62 is set to (45+θb1)°, which is greater than 45°.

Moreover, FIG. 14C shows an example of a case where the angle θ76 formed by the center line L61 of the pitman arm 61 and the abutting face 76 of the pitman arm 61 is set to (90−θb2)°, which is even smaller than the angle (90−θb1)°; that is, an example of a case where the angle θ86 formed by the center line L61 of the stopper 62 and the contact face 86 of the stopper 62 is set to (45+θb2)°, which is even greater than (45+θb1)°.

Accordingly, from the relation shown in FIGS. 14A to 14C, it can be understood that the angle θhb formed by the direction of the input load vector Wh and the direction of the abutting load vector Wb increases as the angle θ76 formed by the center line L61 and the abutting face 76 decreases, and, relative thereto, as the angle θ86 formed by the center line L61 and the contact face 86 of the stopper 62 increases.

Thus, with the arm stopper mechanism 60, the angle θhb formed by the direction of the input load vector Wh and the direction of the abutting load vector Wb can be increased by decreasing the angle θ76 formed by the center line L61 of the pitman arm 61 and the abutting face 76 (that is, by increasing the angle θ86 formed by the center line L61 and the contact face 86 of the stopper 62). Thus, the arm stopper mechanism 60 can cause the input load vector Wh and the abutting load vector Wb to cancel each other and consequently inhibit the value of the bending load vector Wt that is applied to the output shaft 22.

<Configuration of Arm Stopper Mechanism According to First Embodiment>

With the arm stopper mechanism 160 (refer to FIGS. 1A and 1B) according to the first embodiment, based on the foregoing perspective, the angle θhb (refer to FIG. 5) formed by the direction of the input load vector Wh and the direction of the abutting load vector Wb is configured to be greater than the angle θhb (refer to FIG. 14A) of the arm stopper mechanism 60 according to the comparative example in order to inhibit the value of the bending load vector Wt that is applied to the output shaft 22.

Figure 2B:
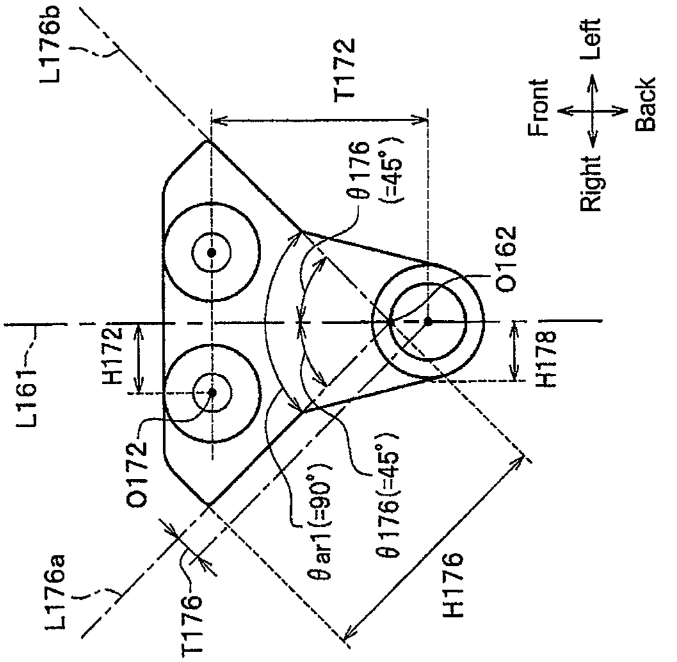
FIGS. 2A and 2B are schematic configuration diagram of the pitman arm of the arm stopper mechanism according to the first embodiment viewed from a lower face direction.
Figure 2A:
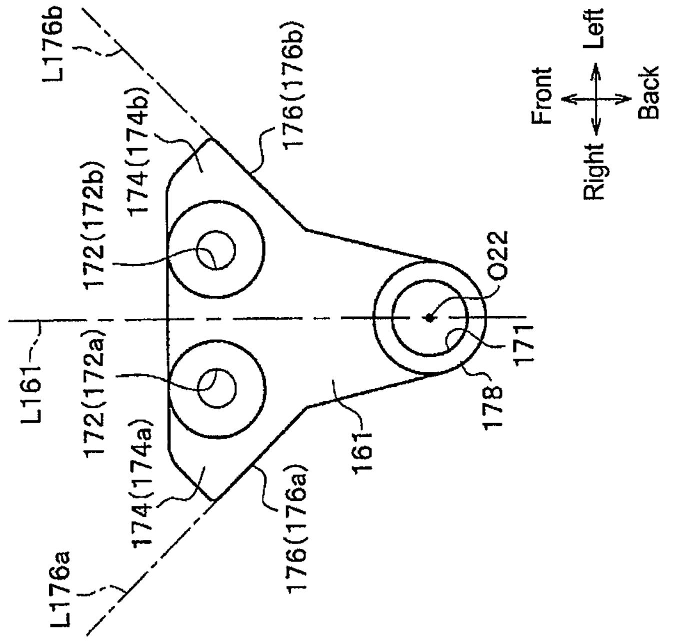

In other words, the arm stopper mechanism 160 according to the first embodiment is configured, as shown in FIGS. 2A and 2B, such that the angle θ176 formed by the center line L161 of the pitman arm 161 and the abutting face 176 is smaller than the angle θ76 (refer to FIG. 14A) of the arm stopper mechanism 60 according to the comparative example, and, relative thereto, such that the angle θ186 formed by the center line L162 of the stopper 162 and the contact face 186 is greater than the angle θ86 (refer to FIG. 14A) of the arm stopper mechanism 60 according to the comparative example.

Figure 1B:
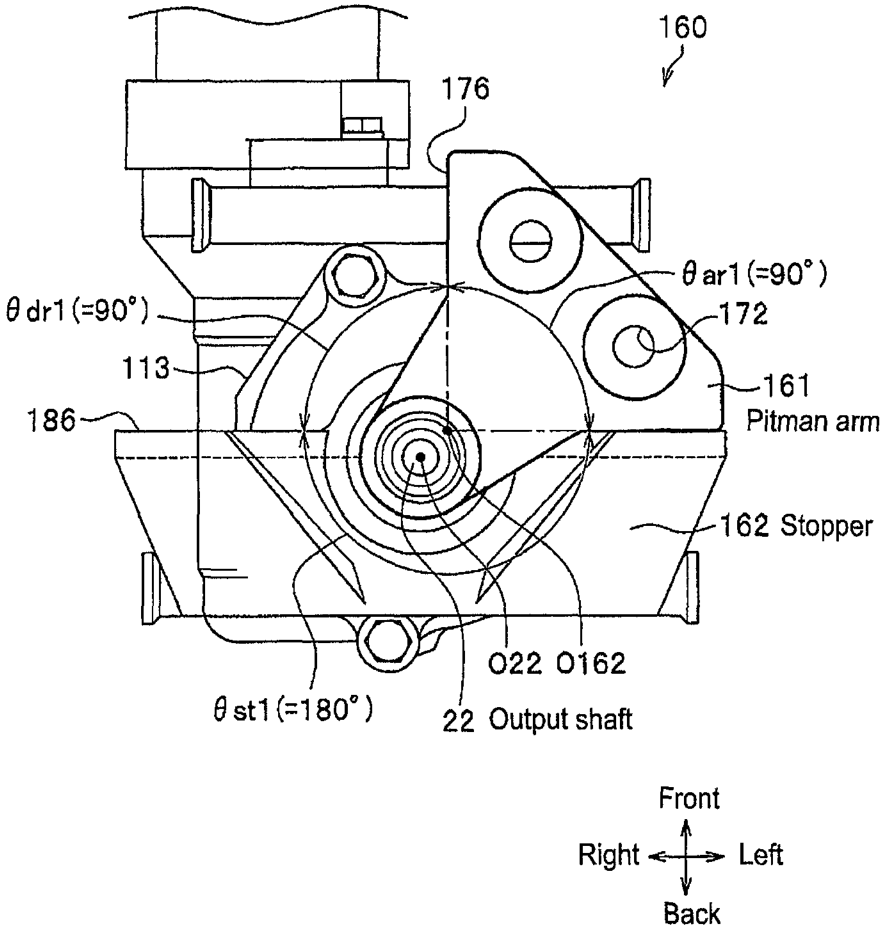
FIG. 1B is a schematic configuration diagram of the arm stopper mechanism according to the first embodiment viewed from a lower face direction.
Figure 3B:
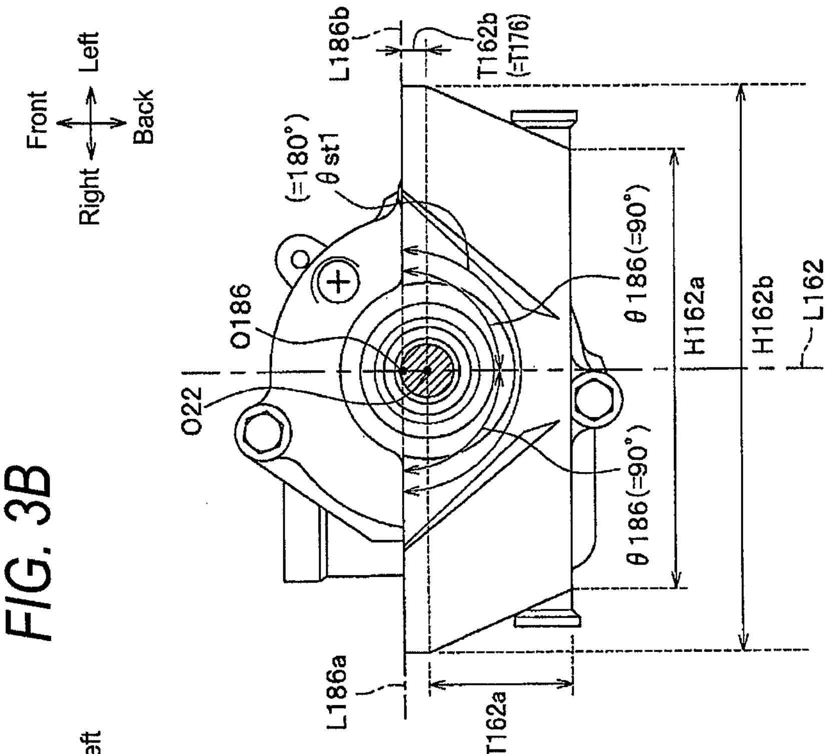
FIGS. 3A and 3B are schematic configuration diagrams of the stopper of the arm stopper mechanism according to the first embodiment viewed from a lower face direction.
Figure 3A:
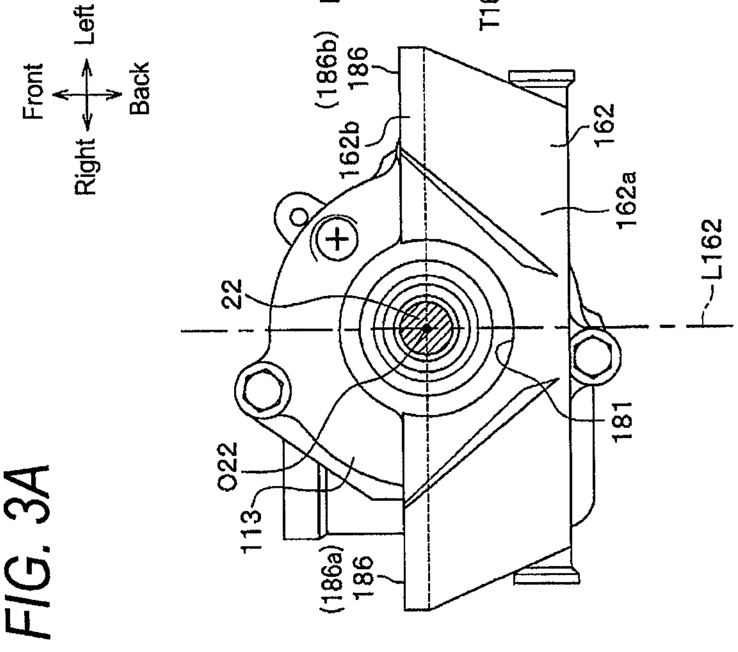
Figure 4B:
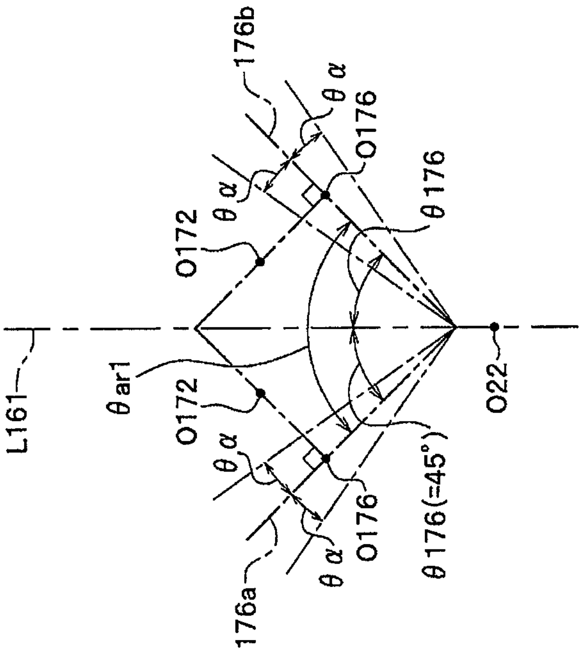
FIGS. 4A and 4B are schematic diagrams showing the ideal configuration of the respective parts of the pitman arm of the arm stopper mechanism according to the first embodiment.
Figure 4A:
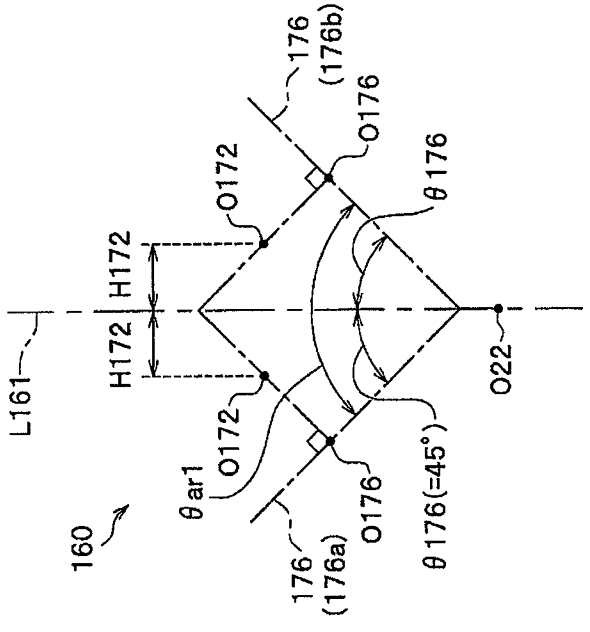

The configuration of the arm stopper mechanism 160 according to the first embodiment is now explained with reference to FIGS. 1A and 1B, and FIGS. 2A and 2B to FIGS. 4A and 4B. FIG. 1A is a schematic configuration diagram of the arm stopper mechanism 160 according to the first embodiment provided to an electric power-steering device 101 viewed from a side face direction. FIG. 1B is a schematic configuration diagram of the arm stopper mechanism 160 according to the first embodiment viewed from a lower face direction. FIGS. 2A and 2B are schematic configuration diagrams of the pitman arm 161 of the arm stopper mechanism 160 according to the first embodiment viewed from a lower face direction. FIG. 2A shows the configuration of the respective parts of the pitman arm 161, and FIG. 2B shows the arrangement of the respective parts of the pitman arm 161. FIGS. 3A and 3B are schematic configuration diagrams of the stopper 162 of the arm stopper mechanism 160 according to the first embodiment viewed from a lower face direction. FIG. 3A shows the configuration of the respective parts of the stopper 162, and FIG. 3B shows the arrangement of the respective parts of the stopper 162. FIGS. 4A and 4B are schematic diagrams showing the ideal arrangement of the respective members of the arm stopper mechanism 160.

The electric power-steering device 101 shown in FIG. 1A is a device that is similar to the electric power-steering device 1 according to the comparative example, and, in substitute for the arm stopper mechanism 60 according to the comparative example, an arm stopper mechanism 160 according to the first embodiment is provided to a lower face side of the housing 113.

As shown in FIG. 1B, the arm stopper mechanism 160 differs in comparison to the arm stopper mechanism 60 according to the comparative example with respect to the shape of the pitman arm 161 and the stopper 162.

FIG. 1B shows the configuration of the arm stopper mechanism 160 viewed from the lower face direction. As shown in FIG. 1B, the arm stopper mechanism 160 comprises a pitman arm 161 which turns about the output shaft 22.

As shown in FIG. 1A, the pitman arm 161 is formed in a plate shape as a whole. In addition, as shown in FIG. 1B and FIGS. 2A and 2B, with the pitman arm 161, a shape thereof viewed from a lower side is a shape of a fan which spreads at an acute angle, and both wings of the fan are bent outward at a halfway portion. In addition, as shown in FIGS. 2A and 2B, the pitman arm 161 has a shape in which the output shaft hole 171 is disposed at a position of a pivot of the fan, and the two tie rod holes 172*a*, 172*b* are disposed at arbitrary positions near a free end of the fan. In the ensuing explanation, the tie rod holes 172*a*, 172*b* are referred to as the "tie rod hole 172" when reference is made collectively.

As a result of the output shaft 22 being fitted inside the output shaft hole 171, the center point thereof will coincide with the center point O22 of the output shaft 22. In the ensuing explanation, the center point of the output shaft hole 171 is referred to as the "center point O22".

The tie rod holes 172*a*, 172*b* are disposed at equal positions on the left and right of the center line L161 of the pitman arm 161. In the example shown in FIGS. 2A and 2B, the tie rod holes 172*a*, 172*b* are disposed such that the respective center points O172 are disposed at positions that are a distance T172 forward from the center point O22 of the output shaft hole 171, and positions that are a distance H172 leftward and rightward from the center line L161 of the pitman arm 161.

Note that, here, the "center line L161 of the pitman arm 161" is explained as the virtual straight line which passes over the center point O22 of the output shaft hole 171 and extends in the front-back direction. The "center line L161 of the pitman arm 161" will coincide with the "center line L162 of the stopper 162 (refer to FIGS. 3A and 3B)" explained later when the steering angle of the steering wheel is 0°. The "center line L162 of the stopper 162" is also the center line of the overall vehicle (virtual straight line which passes the center point in the width direction of the vehicle and extends in the front-back direction of the vehicle).

The pitman arm 161 comprises a circular part 178 having a radius H178 which surrounds the output shaft hole 171 in an arc shape. Moreover, the pitman arm 161 comprises parts (parts protruding outward) 174*a*, 174*b* which are bent outward from the halfway portion of both wings of the fan, and the parts 174*a*, 174*b* functions as the abutting parts to which the stopper 162 is abutted. In the ensuing explanation, the part 174*a* is referred to as the "abutting part 174*a*" and the part 174*b* is referred to as the "abutting part 174*b*". Moreover, the abutting parts 174*a*, 174*b* are referred to as the "abutting part 174" when reference is made collectively.

With the abutting parts 174*a*, 174*b*, the side face portions of the body of the pitman arm 161 formed in a plate shape are formed as flat faces 176*a*, 176*b*, and the flat faces 176*a*, 176*b* function as the abutting faces to which the stopper 162 is abutted. In the ensuing explanation, the flat face 176*a* is referred to as the "abutting face 176*a*" and the flat face 176*b* is referred to as the "abutting face 176*b*". Moreover, the abutting faces 176*a*, 176*b* are referred to as the "abutting face 176" when reference is made collectively.

Note that, in FIGS. 2A and 2B, line L176*a* shows the straight line that is virtually disposed along the abutting face 176*a*. Moreover, line L176*b* shows the straight line that is virtually disposed along the abutting face 176*b*. Moreover, length H176 shows the distance from the point O162, where the line L176*a* and the line L176*b* of the pitman arm 161 intersect, and the end of the abutting face 176.

Meanwhile, as shown in FIG. 1A, the stopper 162 is provided in a manner of protruding in a downward direction from a lower face side of the housing 113 of the electric power-steering device 101. As shown in FIGS. 3A and 3B, with the stopper 162, a shape thereof viewed from a lower side is a shape which connects a trapezoidal part 162*a* of a substantially trapezoidal shape and a rectangular part 162*b* of a substantially rectangular shape with each other.

The trapezoidal part 162*a* and the rectangular part 162*b* are disposed such that they intersect perpendicularly to the center line L162 of the stopper 162. Note that, here, the explanation is provided with the "center line L162 of the stopper 162" as the virtual straight line that passes over the center point O22 of the output shaft 22 and extends in the front-back direction. The "center line L162 of the stopper 162" is also the center line of the overall vehicle.

The trapezoidal part 162*a* and the rectangular part 162*b* are disposed so that the central point on the lower side of the trapezoidal part 162*a* and the central point on the long side of the rectangular part 162*b* coincide with the center point O22 of the output shaft 22. In addition, with the stopper 162, a notch part 181 is formed to surround the output shaft 22 about the center point O22 of the output shaft 22.

Moreover, the stopper 162 is configured such that the protruding amount from the lower face side of the housing 113 increases as the protrusion heads toward the front end side of the rectangular part 162*b* from the rear end side of the trapezoidal part 162*a*. In addition, the stopper 162 is configured such that only the contact face 186 described later, which is provided to the front end side of the rectangular part 162*b*, comes into contact with the pitman arm 161.

In the example shown in FIGS. 3A and 3B, the trapezoidal part 162*a* is formed in a shape with the width of the upper side as H162*a*, the width of the lower side as H162*b*, and the height is T162*a*. Moreover, the rectangular part 162*b* is formed in a shape with the width of the long side as H162*b*, and the width of the short side as T162*b*.

The short side of the rectangular part 162*b* is configured to have a width T162*b* that is the same value as the clearance T176 (refer to FIG. 2B) set to the pitman arm 161. The clearance T176 is the distance between the parallel plane, which passes the center point O22 of the output shaft hole 171 of the pitman arm 161 and is parallel to the abutting face 176, and the abutting face 176. The rectangular part 162*b* functions as the contact face where the flat faces 186*a*, 186*b* positioned on the long side, which is not connected with the trapezoidal part 162*a*, comes into contact with the abutting face 176 (refer to FIG. 2A) of the pitman arm 161. In the ensuing explanation, the flat face 186*a* is referred to as the "contact face 186*a*" and the flat face 186*b* is referred to as the "contact face 186*b*". Moreover, the contact faces 186*a*, 186*b* are referred to as the "contact face 186" when reference is made collectively.

The placement angle θ186 of the respective contact faces 186*a*, 186*b* is set to 90° relative to the center line L162 of the stopper 162. Accordingly, the angle θst1 formed by the contact face 186*a* and the contact face 186*b* is set to 180°.

Note that, in FIGS. 3A and 3B, line L186*a* shows the straight line that is virtually disposed along the contact face 186*a*. Moreover, line L186*b* shows the straight line that is disposed virtually along the contact face 186*b*. Moreover, point O186 shows the point where the line L186*a* and the line L186*b* of the stopper 162 intersect. In the example shown in FIGS. 3A and 3B, the line L186*a* and the line L186*b* are overlapping since the angle θst1 is set to 180°.

With this kind of arm stopper mechanism 160, the respective parts of the pitman arm 161 are preferably configured as shown in FIGS. 4A and 4B. FIGS. 4A and 4B are schematic diagrams showing the ideal configuration of the respective members of the arm stopper mechanism 160. FIG. 4A shows the arrangement of the respective parts of the pitman arm 161, and FIG. 4B shows the angle of orientation of the abutting faces 176*a*, 176*b* of the pitman arm 161.

Here, the arrangement of the abutting face 176 (refer to FIG. 2A) of the pitman arm 161 is mainly explained. With the stopper 162 (refer to FIGS. 1A and 1B) that is abutted to the abutting face 176 of the pitman arm 161, the respective parts are configured in correspondence with the pitman arm 161.

In FIGS. 4A and 4B, line L161 shows the center line of the pitman arm 161. Moreover, point O22 shows the center point of the output shaft hole 171 (refer to FIG. 2A) of the pitman arm 161 and the center point of the output shaft 22. Moreover, point O172 shows the center point of the tie rod hole 172 (refer to FIG. 2A) of the pitman arm 161. Moreover, point O176 shows the abutting center position of the pitman arm 161 (that is, the center position of the part where the abutting face 176 of the pitman arm 161 and the contact face 186 (refer to FIG. 3A) of the stopper 162 according to the first embodiment come into contact). Moreover, length H172 shows the distance from the center line L161 of the pitman arm 161 to the center point O172 of the tie rod hole 172. Moreover, angle θ176 shows the angle formed by the center line L161 of the pitman arm 161 and the abutting face 176.

As evident from the characteristics of the arm stopper mechanism 60 according to the comparative example shown in FIGS. 14A to 14C, the arm stopper mechanism 160 can increase the angle θhb formed by the direction of the input load vector Wh and the direction of the abutting load vector Wb by decreasing the angle θ176 formed by the center line L161 of the pitman arm 161 and the abutting face 176 and, relative thereto, increasing the angle θ186 formed by the center line L162 of the stopper 162 and the contact face 186. Thus, the arm stopper mechanism 160 can cause the input load vector Wh and the abutting load vector Wb to cancel each other, and consequently inhibit the value of the bending load vector Wt that is applied to the output shaft 22.

Thus, with the pitman arm 161 of the arm stopper mechanism 160, the angle θ176 formed by the center line L161 of the pitman arm 161 and the abutting face 176 is set to be smaller than the angle θ76 (refer to FIG. 14A) of the pitman arm 61 of the arm stopper mechanism 60 according to the comparative example. In other words, with the stopper 162 of the arm stopper mechanism 160, the angle θ186 formed by the center line L162 of the stopper 162 and the contact face 186 is set to be smaller than the angle θ86 (refer to FIG. 14A) of the stopper 62 of the arm stopper mechanism 60 according to the comparative example.

However, the arm stopper mechanism 160 needs to prevent the steering wheel from turning beyond a maximum steering angle so that the vehicle will not fall over. Thus, with the pitman arm 161 of the arm stopper mechanism 160, in order to define the maximum steering angle of the steering wheel, for instance, the ideal optimal placement angle of the angle θ176 is set to 45°, and, relative to the angle θ176, an angle of θα (for example, 10°) is set as the angle that is tolerated in terms of design (hereinafter referred to as the "tolerated tilt angle").

The arm stopper mechanism 160 is configured such that, in order to satisfy the foregoing conditions, the abutting faces 176*a*, 176*b* of the pitman arm 161 are tilted at an angle of (45±θα)° in mutually reverse directions relative to the center line L161 about the arbitrary point O162 on the center line L161 of the pitman arm 161. In other words, the angle θar1 formed by the abutting faces 176*a*, 176*b* of the pitman arm 161 is set to an angle of (90±2×θα)°.

For example, FIG. 1B shows the configuration of the arm stopper mechanism 160 when the tolerated tilt angle θα is set to 0°. In the example shown in FIG. 1B, the angle θar1 formed by the abutting faces 176*a*, 176*b* (refer to FIGS. 2A and 2B) provided to the pitman arm 161 is set to 90°. Moreover, the angle θst1 formed by the contact faces 186*a*, 186*b* (refer to FIGS. 3A and 3B) provided to the stopper 162 is set to 180°. Moreover, the maximum steering angle θdr1 for turning the pitman arm 161 is set to 90° (that is, the maximum steering angle in the clockwise direction is 45° and the maximum steering angle in the counterclockwise direction is 45°).

<Load Vectors Applied to Principal Parts of Arm Stopper Mechanism According to First Embodiment>

The load vectors that are applied to the principal parts of the arm stopper mechanism 160 are now explained with reference to FIG. 5. FIG. 5 is an explanatory diagram of the load vectors applied to the principal parts of the arm stopper mechanism 160.

Here, the explanation is provided with the load vector from the side of the wheels 9 (refer to FIG. 1A) which is input to the pitman arm 161 from the tie rod holes 172 as the "input load vector Wh", the load vector applied to the abutting face 176 of the pitman arm 161 from the contact face 186 of the stopper 162 as the "abutting load vector Wb", and the load vector applied to the output shaft 22 fitted into the output shaft hole 171 (refer to FIG. 2A) as the "bending load vector Wt".

Moreover, here, the center position of the part where the abutting face 176 of the pitman arm 161 and the contact face 186 of the stopper 162 come into contact is referred to as the "abutting center position O176", and the explanation is provided on the assumption that the abutting load vector Wb is applied to the abutting center position O176. Note that, in the example shown in FIG. 5, the abutting center position O176 is set at a position which is a distance R1 that is rightward and a distance T162*b* (that is, distance T176 (refer to FIG. 2B)) that is forward from the center point O22 of the output shaft 22.

Figure 5:
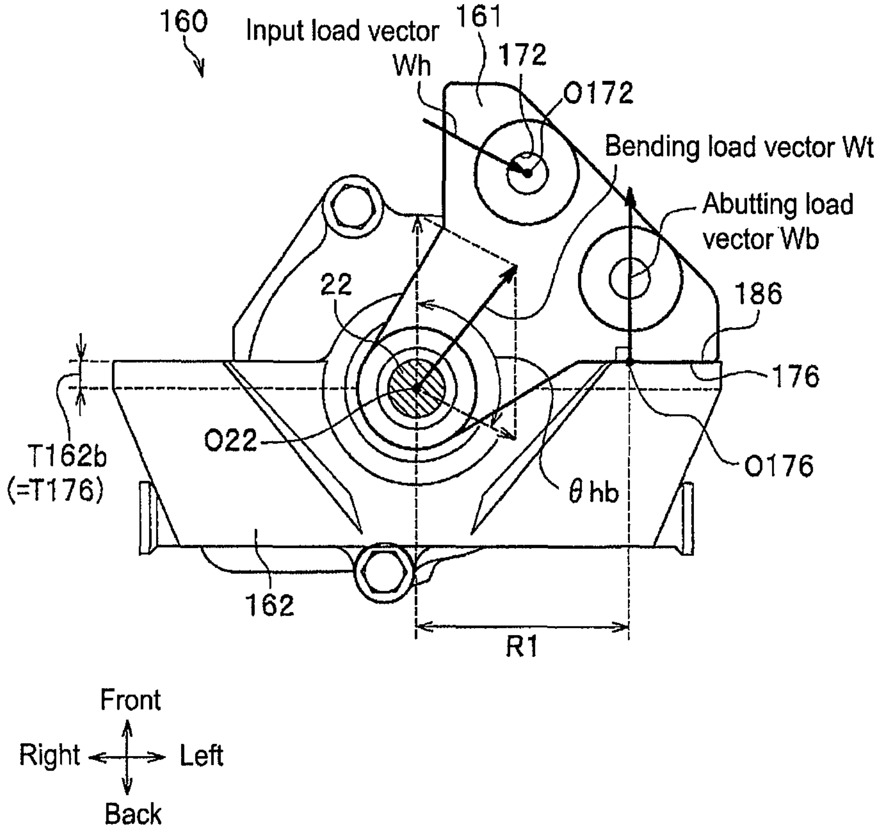
FIG. 5 is an explanatory diagram of the load vectors applied to the principal parts of the arm stopper mechanism according to the first embodiment.

Moreover, here, as shown in FIG. 5, the explanation is provided on the assumption that the left-side abutting face 176 of the pitman arm 161 is abutted to the left-side contact face 186 of the stopper 162. In the foregoing case, as shown in FIG. 5, with the arm stopper mechanism 160, the input load vector Wh is applied around the tie rod holes 172, the abutting load vector Wb is applied to the abutting center position O176, and the bending load vector Wt is applied to the output shaft 22.

The value of the bending load vector Wt becomes the value of the synthetic vector obtained by synthesizing the input load vector Wh and the abutting load vector Wb. Note that the direction of the input load vector Wh is determined by the mounting direction of the tie rods 8 (refer to FIG. 1A) mounted on the tie rod holes 172. Moreover, the direction of the abutting load vector Wb is a direction that is perpendicular to the abutting face 176 of the pitman arm 161.

With the arm stopper mechanism 160, since the pitman arm 161 and the stopper 162 are configured as described above, the input load vector Wh and the abutting load vector Wb work to cancel each other. Thus, the arm stopper mechanism 160 can lower the value of the bending load vector Wt that is applied to the output shaft 22 in comparison to the arm stopper mechanism 60 according to the comparative example. Thus, the arm stopper mechanism 160 can inhibit the bending load that is applied to the output shaft 22.

In particular, the arm stopper mechanism 160 may be configured so that the value of the bending load vector Wt that is applied to the output shaft 22 will be a value that is not greater than the synthetic vector when the input load vector Wh and the abutting load vector Wb are caused to be orthogonal. The arm stopper mechanism 160 can thereby considerably decrease the value of the bending load vector Wt that is applied to the output shaft 22 and consequently inhibit, in an efficient manner, the bending load that is applied on the output shaft 22.

With this kind of arm stopper mechanism 160, as a result of the angle θst1 formed by the two contact faces 186 of the stopper 162 being set to be greater than the angle θar1 formed by the two abutting faces 176 of the pitman arm 161, and 90° or more, it is possible to cause the input load vector Wh and the abutting load vector Wb to cancel each other. Consequently, the arm stopper mechanism 160 can inhibit the value of the bending load vector Wt that is applied to the output shaft 22. Thus, the arm stopper mechanism 160 can inhibit the bending load that is applied to the output shaft 22. In addition, by setting the angle θst1 formed by the two contact faces 186 of the stopper 162 to be greater than the angle θar1 formed by the two abutting faces 176 of the pitman arm 161, and 90° or more, since the arm stopper mechanism 160 can set the angle θar1 of the pitman arm 161 to be smaller relative thereto, the pitman arm 161 can be configured in a compact manner.

In particular, when the angle θst formed by the two contact faces 186 of the stopper 162 is set to 180° of more, the arm stopper mechanism 160 can cause the abutting center position O176, to which the abutting load vector Wb is applied, to approach the periphery of the tie rod holes 72 to which the input load vector Wh is applied. Thus, in the foregoing case, the arm stopper mechanism 160 can efficiently inhibit the vibration.

Moreover, with the arm stopper mechanism 160, preferably, an angle of 90° or more is maintained as the total maximum steering angle in the clockwise direction and the counterclockwise direction. Thus, with the arm stopper mechanism 160, preferably, the total value of the angle θst1 formed by the two contact faces 186 of the stopper 162 and the angle θar1 formed by the two abutting faces 176 of the pitman arm 161 is 270° or less. The arm stopper mechanism 160, upon satisfying the foregoing conditions, can ensure an angle of 90° or more is maintained as the total maximum steering angle in the clockwise direction and the counterclockwise direction.

As described above, according to the arm stopper mechanism 160 of the first embodiment, it is possible to inhibit the value of the bending load vector Wt that is applied to the output shaft 22.

Moreover, since the electric power-steering device 101 can inhibit the vibration of the steering wheel as a result of the arm stopper mechanism 160 being provided on the lower face side of the housing 113, it can improve the operability.

Second Embodiment

The arm stopper mechanism 160 according to the first embodiment was configured such that the abutting face 176 is provided to the side face portion of the body of the pitman arm 161. The pitman arm 161 is configured such that the abutting part 174 is protruding to the outside (turning direction), on which the abutting face 176 is formed, in order to define the maximum steering angle of the steering wheel.

Meanwhile, in the second embodiment, provided is an arm stopper mechanism 260 that is configured such that the abutting part does not protrude to the outside.

<Configuration of Arm Stopper Mechanism According to Second Embodiment>

Figure 6:
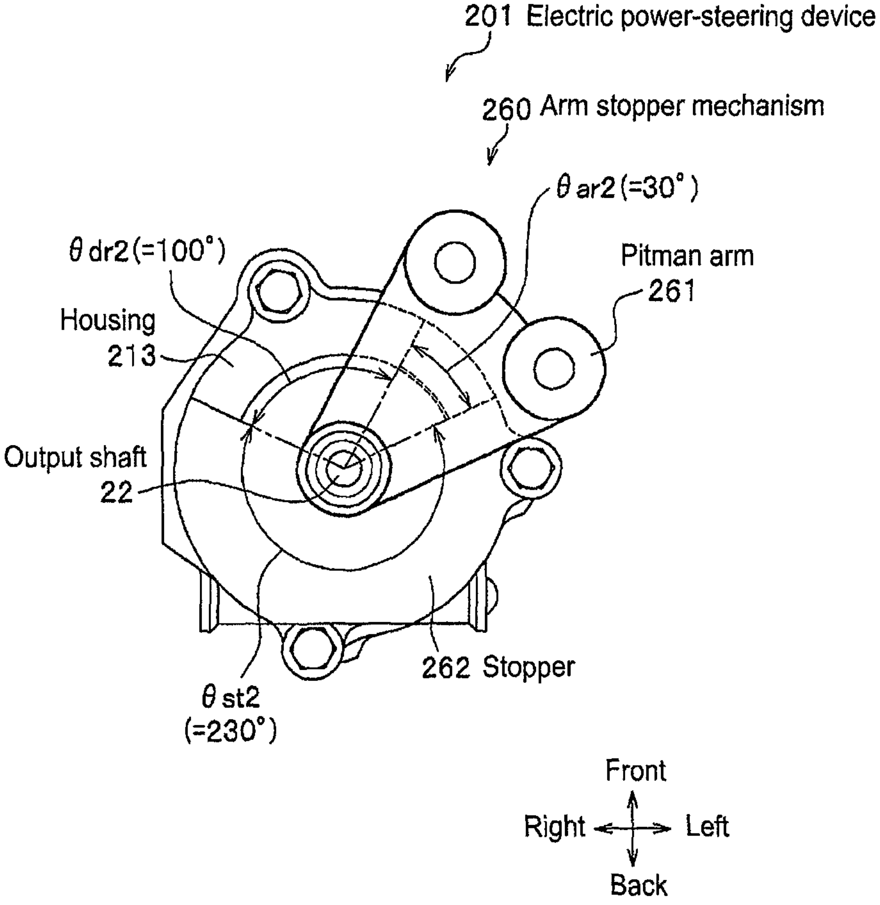
FIG. 6 is a schematic configuration diagram of the arm stopper mechanism according to the second embodiment viewed from a lower face direction.
Figure 7C:
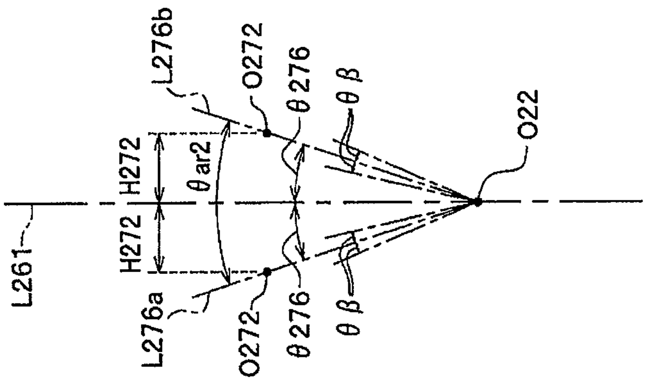
FIGS. 7A to 7C are schematic configuration diagrams of the pitman arm of the arm stopper mechanism according to the second embodiment viewed from a lower face direction.
Figure 7B:
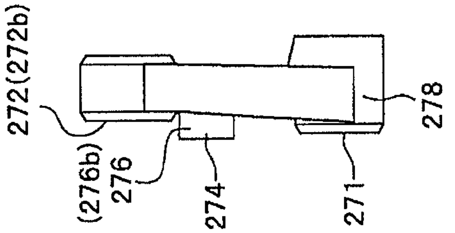
Figure 7A:
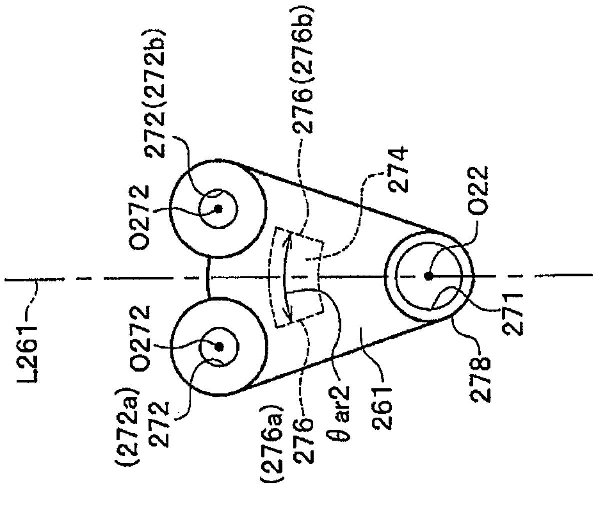
Figure 8:
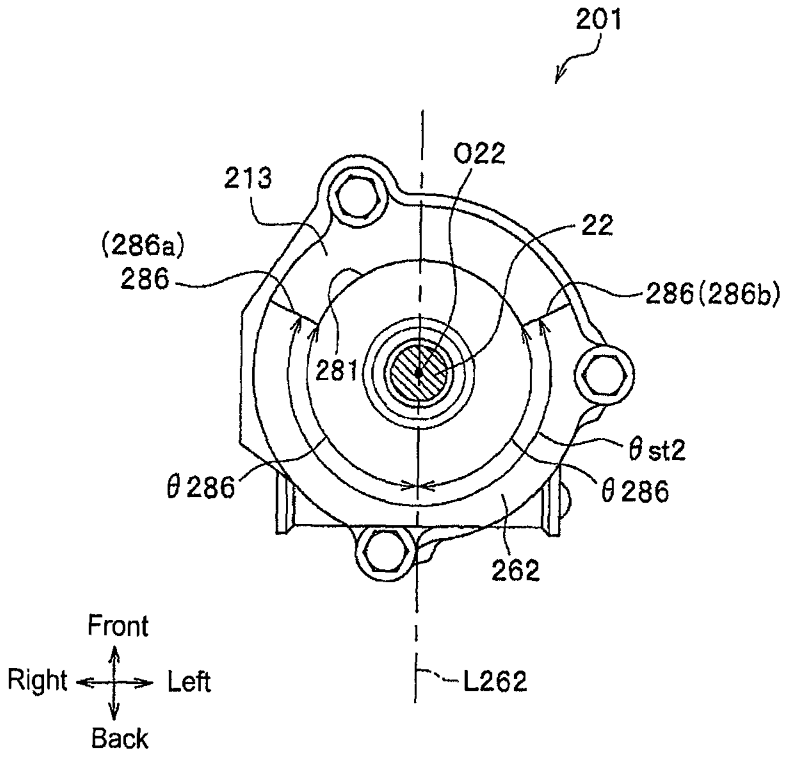
FIG. 8 is a schematic configuration diagram of the stopper of the arm stopper mechanism according to the second embodiment viewed from a lower face direction.

The configuration of the arm stopper mechanism 260 according to the second embodiment is now explained with reference to FIG. 6 to FIG. 8. FIG. 6 is a schematic configuration diagram of the arm stopper mechanism 260 according to the second embodiment viewed from a lower face direction. FIGS. 7A to 7C are schematic configuration diagrams of the pitman arm 261 of the arm stopper mechanism 260 according to the second embodiment viewed from a lower face direction. FIG. 7A shows the configuration of the respective parts of the pitman arm 261, FIG. 7B shows the configuration of the pitman arm 261 viewed from the side face direction, and FIG. 7C shows the arrangement of the respective parts of the pitman arm 261. FIG. 8 is a schematic configuration diagram of the stopper 262 of the arm stopper mechanism 260 according to the second embodiment viewed from a lower face direction. FIG. 8 shows the configuration of the respective parts of the stopper 262.

FIG. 6 shows the configuration of the arm stopper mechanism 260 viewed from the lower face direction. As shown in FIG. 6, the arm stopper mechanism 260 comprises a pitman arm pitman arm 261 which turns about the output shaft 22.

As shown in FIG. 7B, the pitman arm 261 is formed in a plate shape as a whole. In addition, as shown in FIG. 6 and FIG. 7A, with the pitman arm 261, a shape thereof viewed from a lower side is a shape of a fan which spreads at an acute angle. In addition, as shown in FIGS. 7A to 7C, the pitman arm 261 has a shape in which the output shaft hole 271 is disposed at a position of a pivot of the fan, and the two tie rod holes 272*a*, 272*b* are disposed at arbitrary positions near a free end of the fan. In the ensuing explanation, the tie rod holes 272*a*, 272*b* are referred to as the "tie rod hole 272" when reference is made collectively.

As a result of the output shaft 22 being fitted inside the output shaft hole 271, the center point thereof will coincide with the center point O22 of the output shaft 22. In the ensuing explanation, the center point of the output shaft hole 271 is referred to as the "center point O22".

The tie rod holes 272*a*, 272*b* are disposed at equal positions on the left and right of the center line L261 of the pitman arm 261. In the example shown in FIG. 7C, the tie rod holes 272*a*, 272*b* are disposed such that the respective center points O272 are disposed forward from the center point O22 of the output shaft hole 271, and at positions that are a distance H272 leftward and rightward from the center line L261 of the pitman arm 261.

Note that, here, the "center line L261 of the pitman arm 261" is explained as the virtual straight line which passes over the center point O22 of the output shaft hole 271 and extends in the front-back direction. The "center line L261 of the pitman arm 261" will coincide with the "center line L262 of the stopper 262 (refer to FIG. 8)" explained later when the steering angle of the steering wheel is 0°. The "center line L262 of the stopper 262" is also the center line of the overall vehicle (virtual straight line which passes the center point in the width direction of the vehicle and extends in the front-back direction of the vehicle).

The pitman arm 261 comprises a circular part 278 which surrounds the output shaft hole 271 in an arc shape. Moreover, the pitman arm 261 comprises a protruding part 274 which protrudes upward near the center of the top face of the body of the pitman arm 261, and the protruding part 274 functions as the abutting part to which the stopper 262 is abutted. In the ensuing explanation, the protruding part 274 is referred to the "abutting part 274".

With the abutting parts 274, the side face portions thereof are formed as flat faces 276*a*, 276*b*, and the flat faces 276*a*, 276*b* function as the abutting faces to which the stopper 262 is abutted. In the ensuing explanation, the flat face 276*a* is referred to as the "abutting face 276*a*" and the flat face 276*b* is referred to as the "abutting face 276*b*". Moreover, the abutting faces 276*a*, 276*b* are referred to as the "abutting face 276" when reference is made collectively.

Note that, in FIG. 7C, line L276*a* shows the straight line that is virtually disposed along the abutting face 276*a*. Moreover, line L276*b* shows the straight line that is virtually disposed along the abutting face 276*b*.

Meanwhile, the stopper 262 is provided in a manner of protruding in a downward direction from a lower face side of the housing 213 of the electric power-steering device 201. As shown in FIG. 8, with the stopper 262, a shape thereof viewed from a lower side is formed in a substantially circular shape centering around the center point O22 of the output shaft 22 and notched with the notch part 281 in an arc shape. With the stopper 262, the end faces 286*a*, 286*b* notched with the notch part 281 function as the contact faces. In the ensuing explanation, the end face 286*a* is referred to as the "contact face 286*a*" and the end face 286*b* is referred to as the "contact face 286*b*". Moreover, the contact faces 286*a*, 286*b* are referred to as the "contact face 286" when reference is made collectively.

Note that, here, the explanation is provided with the "center line L262 of the stopper 262" as the virtual straight line that passes the center point O22 of the output shaft 22 and extends in the front-back direction. The "center line L262 of the stopper 262" is also the center line of the overall vehicle.

As evident from the characteristics of the arm stopper mechanism 60 according to the comparative example shown in FIGS. 14A to 14C, the arm stopper mechanism 260 can increase the angle θhb formed by the direction of the input load vector Wh and the direction of the abutting load vector Wb by decreasing the angle θ276 formed by the center line L261 of the pitman arm 261 and the abutting face 276 and, relative thereto, increasing the angle θ286 formed by the center line L262 of the stopper 262 and the contact face 286. Thus, the arm stopper mechanism 260 can cause the input load vector Wh and the abutting load vector Wb to cancel each other, and consequently inhibit the value of the bending load vector Wt that is applied to the output shaft 22.

Thus, with the pitman arm 261 of the arm stopper mechanism 260, the angle θ276 formed by the center line L261 of the pitman arm 261 and the abutting face 276 is set to be smaller than the angle θ76 of the pitman arm 61 of the arm stopper mechanism 60 according to the comparative example. In other words, with the stopper 262 of the arm stopper mechanism 260, the angle θ286 formed by the center line L262 of the stopper 262 and the contact face 286 is set to be smaller than the angle θ86 (refer to FIG. 14A) of the stopper 62 of the arm stopper mechanism 60 according to the comparative example.

However, the arm stopper mechanism 260 needs to prevent the steering wheel from turning beyond a maximum steering angle so that the vehicle will not fall over. Thus, with the pitman arm 261 of the arm stopper mechanism 260, in order to define the maximum steering angle of the steering wheel, for instance, the optimal placement angle of the abutting face 276 relative to the center line L261 is set as the tilt angle θ276 of the virtual straight lines L276*a*, L276*b* that connect the center point O272 of the tie rod hole 272 relative to the center line L261 and the center point O22 of the output shaft hole 271, and an angle of θβ (for example, 5°) is set as the tolerated tilt angle, which is tolerated in terms of design, is set to the angle θ276.

The arm stopper mechanism 260 is configured such that, in order to satisfy the foregoing conditions, the abutting faces 276*a*, 276*b* of the pitman arm 261 are tilted at an angle of $(\theta 276 \pm \theta\beta)^\circ$ in mutually reverse directions relative to the center line L261 about the center point O22 of the output shaft hole 271. In other words, the angle $\theta ar2$ formed by the abutting faces 276*a*, 276*b* of the pitman arm 261 is set to an angle of $(2 \times (\theta 276 \pm \theta\beta))^\circ$.

For example, FIG. 6 shows the configuration of the arm stopper mechanism 260 when the tilt angle $\theta 276$ of the straight lines L276*a*, L276*b* is set to 15° (that is, the angle $\theta ar2$ formed by the abutting faces 276*a*, 276*b* (refer to FIGS. 7A to 7C) provided to the pitman arm 261 is set to 30°), and the tolerated tilt angle $\theta\beta$ is set to 0°. In the example shown in FIG. 6, with the arm stopper mechanism 260, the angle $\theta ar2$ formed by the abutting faces 276*a*, 276*b* (refer to FIGS. 7A to 7C) provided to the pitman arm 261 is set to 30°. Moreover, the angle $\theta st2$ formed by the contact faces 286*a*, 286*b* (refer to FIG. 8) provided to the stopper 262 is set to 230°. Moreover, the maximum steering angle $\theta dr2$ for turning the pitman arm 261 is set to 100°.

<Load Vectors Applied to Principal Parts of Arm Stopper Mechanism According to Second Embodiment>

Figure 9:
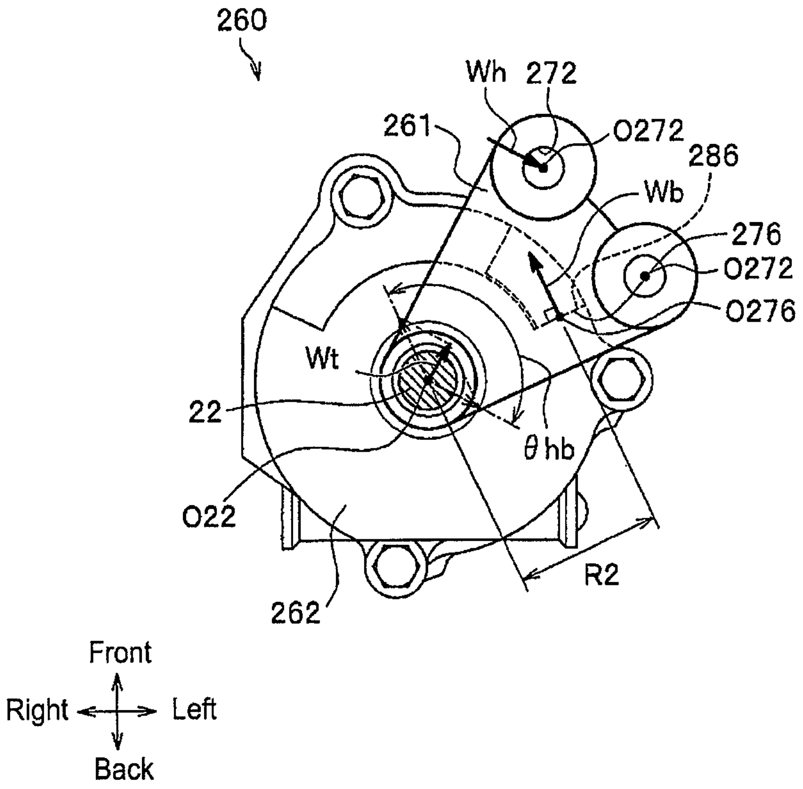
FIG. 9 is an explanatory diagram of the load vectors applied to the principal parts of the arm stopper mechanism according to the second embodiment.

The load vectors that are applied to the principal parts of the arm stopper mechanism 260 are now explained with reference to FIG. 9. FIG. 9 is an explanatory diagram of the load vectors applied to the principal parts of the arm stopper mechanism 260.

Here, the explanation is provided with the load vector from the side of the wheels 9 (refer to FIG. 1A) which is input to the pitman arm 261 from the tie rod holes 272 as the "input load vector Wh", the load vector applied to the abutting face 276 of the pitman arm 261 from the contact face 286 of the stopper 262 as the "abutting load vector Wb", and the load vector applied to the output shaft 22 fitted into the output shaft hole 271 (refer to FIG. 7A) as the "bending load vector Wt".

Moreover, here, the center position of the part where the abutting face 276 of the pitman arm 261 and the contact face 286 of the stopper 262 come into contact is referred to as the "abutting center position O276", and the explanation is provided on the assumption that the abutting load vector Wb is applied to the abutting center position O276. Note that, in the example shown in FIG. 9, the abutting center position O276 is set at a position which is a distance R2 from the center point O22 of the output shaft 22 between the center point O22 of the output shaft 22 and the center point O272 of the tie rod hole 272.

Moreover, here, as shown in FIG. 9, the explanation is provided on the assumption that the left-side abutting face 276 of the pitman arm 261 is abutted to the left-side contact face 286 of the stopper 262. In the foregoing case, as shown in FIG. 9, with the arm stopper mechanism 260, the input load vector Wh is applied around the tie rod holes 272, the abutting load vector Wb is applied to the abutting center position O276, and the bending load vector Wt is applied to the output shaft 22.

The value of the bending load vector Wt becomes the value of the synthetic vector obtained by synthesizing the input load vector Wh and the abutting load vector Wb. Note that the direction of the input load vector Wh is determined by the mounting direction of the tie rods 8 (refer to FIG. 1A) mounted on the tie rod holes 272. Moreover, the direction of the abutting load vector Wb is a direction that is perpendicular to the abutting face 276 of the pitman arm 261.

With the arm stopper mechanism 260, since the pitman arm 261 and the stopper 262 are configured as described above, the input load vector Wh and the abutting load vector Wb work to cancel each other. Thus, the arm stopper mechanism 260 can lower the value of the bending load vector Wt that is applied to the output shaft 22 in comparison to the arm stopper mechanism 60 according to the comparative example. Thus, the arm stopper mechanism 260 can inhibit the bending load that is applied to the output shaft 22.

In particular, the arm stopper mechanism 260 may be configured so that the value of the bending load vector Wt that is applied to the output shaft 22 will be a value that is not greater than the synthetic vector when the input load vector Wh and the abutting load vector Wb are caused to be orthogonal. The arm stopper mechanism 260 can thereby considerably decrease the value of the bending load vector Wt that is applied to the output shaft 22 and consequently inhibit, in an efficient manner, the bending load that is applied on the output shaft 22.

As described above, according to the arm stopper mechanism 260 of the second embodiment, as with the arm stopper mechanism 160 according to the first embodiment, it is possible to inhibit the value of the bending load vector Wt that is applied to the output shaft 22.

In addition, according to the arm stopper mechanism 260, since the configuration is such that the abutting part 274 of the pitman arm 261 does not protrude to the outside (turning direction), it is possible to achieve a more compact configuration than the arm stopper mechanism 160 according to the first embodiment.

Moreover, since the electric power-steering device 201 can inhibit the vibration of the steering wheel as a result of the arm stopper mechanism 260 being provided on the lower face side of the housing 213, it can improve the operability.

The present invention is not limited to the embodiments described above, and may be various changed or modified to the extent that such change or modification does not deviate from the gist of the present invention.

<<Note>>

The arm stopper mechanism according to the present invention includes a pitman arm which turns around an output shaft on a lower face side of a housing of an electric power-steering device and to which two tie rods respectively connected to wheels are mounted, and a stopper which is provided around the output shaft on the lower face side of the housing of the electric power-steering device and which restricts a turning angle of the pitman arm, the pitman arm includes an output shaft hole into which the output shaft is fitted, two tie rod holes onto which the tie rods are respectively mounted, and two abutting faces to which the stopper is abutted, the stopper includes two contact faces which respectively come into contact with the two abutting faces of the pitman arm, the two abutting faces of the pitman arm are respectively disposed such that, when one of the abutting faces comes into contact with the contact face of the stopper, the bending load vector that is applied to the output shaft fitted into the output shaft hole becomes a value which is not greater than the synthetic vector of the input load vector and the abutting load vector when the input load vector and the abutting load vector are caused to be orthogonal as a result of the input load vector that is input from the tie rod hole on the far side and the abutting load vector applied to the abutting face working to cancel each other. Note that the direction of the input load vector is determined based on the mounting direction of the tie rods mounted on the tie rod holes. Moreover, the direction of the abutting load vector will be a direction that is perpendicular to the abutting face of the pitman arm.

What is claimed is:

1. An arm stopper mechanism, comprising:

a pitman arm which turns around an output shaft on a lower face side of a housing of an electric power-steering device and to which two tie rods connected to wheels are mounted; and a stopper which is provided around the output shaft on the lower face side of the housing of the electric power-steering device and which restricts a turning angle of the pitman arm, wherein the pitman arm includes:

an output shaft hole having a virtual straight line which passes a center point in a width direction of a vehicle and extends in a front-back direction of the vehicle as a center line, and into which the output shaft is fitted;

two tie rod holes provided at positions forward of the output shaft hole on left and right of the center line and onto which the tie rods are respectively mounted; and two abutting faces provided at positions forward of the output shaft hole and rearward of the tie rod holes on left and right of the center line and to which the stopper is abutted, the stopper includes two contact faces provided at positions in a turning direction of the abutting faces of the pitman arm on left and right of the center line and which come into contact with the respective abutting faces of the pitman arm, an internal angle formed by the two contact faces of the stopper is greater than an internal angle formed by the two abutting faces of the pitman arm and is more than 90°, said internal angle defined by the two contact faces of the stopper being formed in such a manner that a bisector thereof intersects the stopper and the stopper is contained within the internal angle formed by the two contact faces of the stopper, the pitman arm is formed in a plate shape as a whole and a shape thereof viewed from a lower side is a shape of a fan which spreads at an acute angle, the output shaft hole is disposed at a position of a pivot of the fan, and the two tie rod holes are disposed in a vicinity of both wings in a vicinity of a free end of the fan, the two abutting faces of the pitman arm are respectively provided to side face portions of a protruding part which protrudes upward in a vicinity of a center of a top face of a body of the pitman arm, the stopper is provided in a manner of protruding in a downward direction from the lower face side of the housing of the electric power-steering device, and a shape thereof viewed from a lower side is a shape which connects a trapezoidal part of a substantially trapezoidal shape and a rectangular part of a substantially rectangular shape with each other, the trapezoidal part and the rectangular part are disposed such that a central point on a lower side of the trapezoidal part and a central point on a long side of the rectangular part coincide with a central point of the output shaft, and the rectangular part is configured such that a short side is a width of a value which is the same as a clearance between a parallel plane, which passes a center point of the output shaft hole of the pitman arm and is parallel to the abutting face, and the abutting face, and a long side on a side that is not connected with the trapezoidal part functions as the contact face.

2. The arm stopper mechanism according to claim 1, wherein the angle formed by the two contact faces of the stopper is 180° or more.

3. The arm stopper mechanism according to claim 1, wherein a total value of the angle formed by the two contact faces of the stopper and the angle formed by the two abutting faces of the pitman arm is 270° or less.

4. The arm stopper mechanism according to claim 1, wherein the two tie rod holes are disposed in a vicinity of both wings in a vicinity of a free end of the fan, and the two abutting faces of the pitman arm are respectively provided to side face portions of a protruding part which protrudes upward in a vicinity of a center of a top face of a body of the pitman arm.

5. The arm stopper mechanism according to claim 4, wherein the stopper is provided in a manner of protruding in a downward direction from the lower face side of the housing of the electric power-steering device, and a shape thereof viewed from a lower side is formed in a substantially circular shape centering around a center point of the output shaft and notched in an arc shape, and notched end faces function as the contact faces.

6. An electric power-steering device, wherein the arm stopper mechanism according to claim 1 is provided to the lower face side of the housing.

7. An arm stopper mechanism, comprising:

a pitman arm which turns around an output shaft on a lower face side of a housing of an electric power-steering device and to which two tie rods connected to wheels are mounted; and a stopper which is provided around the output shaft on the lower face side of the housing of the electric power-steering device and which restricts a turning angle of the pitman arm, wherein the pitman arm includes:

an output shaft hole having a virtual straight line which passes a center point in a width direction of a vehicle and extends in a front-back direction of the vehicle as a center line, and into which the output shaft is fitted;

two tie rod holes provided at positions forward of the output shaft hole on left and right of the center line and onto which the tie rods are respectively mounted; and two abutting faces provided at positions forward of the output shaft hole and rearward of the tie rod holes on left and right of the center line and to which the stopper is abutted, the stopper includes two contact faces provided at positions in a turning direction of the abutting faces of the pitman arm on left and right of the center line and which come into contact with the respective abutting faces of the pitman arm, an internal angle formed by the two contact faces of the stopper is greater than an internal angle formed by the two abutting faces of the pitman arm and is more than 90°, said internal angle defined by the two contact faces of the stopper being formed in such a manner that a bisector thereof intersects the stopper and the stopper is contained within the internal angle formed by the two contact faces of the stopper, the stopper is provided in a manner of protruding in a downward direction from the lower face side of the housing of the electric power-steering device, and a shape thereof viewed from a lower side is a shape which connects a trapezoidal part of a substantially trapezoidal shape and a rectangular part of a substantially rectangular shape with each other, the trapezoidal part and the rectangular part are disposed such that a central point on a lower side of the trapezoidal part and a central point on a long side of the rectangular part coincide with a central point of the output shaft, the rectangular part is configured such that a short side is a width of a value which is the same as a clearance between a parallel plane, which passes a center point of the output shaft hole of the pitman arm and is parallel to the abutting face, and the abutting face, and a long side on a side that is not connected with the trapezoidal part functions as the contact face.

8. The arm stopper mechanism according to claim 7, wherein the angle formed by the two contact faces of the stopper is 180° or more.

9. The arm stopper mechanism according to claim 7, wherein a total value of the angle formed by the two contact faces of the stopper and the angle formed by the two abutting faces of the pitman arm is 270° or less.

10. The arm stopper mechanism according to claim 7, wherein the pitman arm is formed in a plate shape as a whole, a shape thereof viewed from a lower side is a shape of a fan which spreads at an acute angle, both wings of the fan being bent outward at a halfway portion, the output shaft hole is disposed at a position of a pivot of the fan, the two tie rod holes are disposed at arbitrary positions in a vicinity of a free end of the fan, and the two abutting faces of the pitman arm are respectively provided to side face portions of a body of the pitman arm.

11. The arm stopper mechanism according to claim 7, wherein the pitman arm is formed in a plate shape as a whole and a shape thereof viewed from a lower side is a shape of a fan which spreads at an acute angle, the output shaft hole is disposed at a position of a pivot of the fan, and the two tie rod holes are disposed in a vicinity of both wings in a vicinity of a free end of the fan, and wherein the two abutting faces of the pitman arm are respectively provided to side face portions of a protruding part which protrudes upward in a vicinity of a center of a top face of a body of the pitman arm.

12. An electric power-steering device, wherein the arm stopper mechanism according to claim 7 is provided to the lower face side of the housing.

* * * * *